US006314108B1

(12) United States Patent
Ramasubramani et al.

(10) Patent No.: US 6,314,108 B1
(45) Date of Patent: Nov. 6, 2001

(54) METHOD AND APPARATUS FOR PROVIDING NETWORK ACCESS OVER DIFFERENT WIRELESS NETWORKS

(75) Inventors: Seetharaman Ramasubramani, San Jose; Steven S. Boyle, Fremont; Mark A. Fox, San Francisco, all of CA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/070,668

(22) Filed: Apr. 30, 1998

(51) Int. Cl.$^7$ .................................. H04J 3/16; H04J 3/22
(52) U.S. Cl. ............................................. 370/465; 370/401
(58) Field of Search .................................... 370/465, 466, 370/467, 469, 471, 401, 402, 389, 351, 352, 353, 395, 385, 387; 710/105; 709/219, 230, 231, 232

(56) References Cited

U.S. PATENT DOCUMENTS

| | | | |
|---|---|---|---|
| 5,673,322 | 9/1997 | Brockman et al. ................ | 705/52 |
| 5,742,905 | 4/1998 | Brockman et al. ................ | 455/461 |
| 5,809,415 | 9/1998 | Rossmann ........................ | 455/422 |
| 5,991,292 | * 11/1999 | Focscaneanu et al. ........... | 370/352 |
| 6,065,120 | * 5/2000 | Laursen et al. .................. | 713/201 |
| 6,101,189 | * 8/2000 | Tsuruoka ........................ | 370/401 |
| 6,118,777 | * 9/2000 | Sylvain .......................... | 370/351 |
| 6,119,155 | * 9/2000 | Rossmann et al. ............... | 709/219 |
| 6,119,167 | 9/2000 | Boyle et al. ..................... | 709/234 |
| 6,134,432 | * 10/2000 | Holmes et al. .................. | 455/412 |
| 6,138,158 | 10/2000 | Boyle et al. ..................... | 709/225 |

FOREIGN PATENT DOCUMENTS 97 41654 A   11/1997   (WO) .

OTHER PUBLICATIONS

Fielding et al., "Hypertext Transfer Protocol—HTTP/1.1", Internet–Draft HTTP Working Group, Aug. 1996.
"Smart Messaging Specification", Nokia Mobile Phones Ltd., Sep. 15, 1997.
HDML 2.0 Language Reference, Version 2.0, Unwired Planet, Inc. Software Developer Kit, Jul. 1997.
"HDTP Specification", Version 1.1–Draft, Unwired Planet, Inc. Jul. 15, 1997.
Sietmann, R, "Mobil INS Internet, Wireless Application Protocol Adaptiert Mobiltelefone Fuer DAS WWW", CT Magazin Fuer Computer Technik, No. 4, Jan. 1, 1998, pp. 202–207.
Kreller, B. et al., "UMTS: A Middleware Architecture and Mobile API Approach", IEEE Personal Communications, vol. 5, No. 2, Apr. 1, 1998.
Hild, S.G. et al., "Mobilizing Applications", IEEE Personal Communications, vol. 4, No. 5, Oct. 1997.
Fujino N. et al., "Mobile Information Service Based On Multiagent Architecture" IEICE Transactions On Communications, vol. E80–B, No. 10, Oct. 1997.
Wu, C–S. et al., "Internet Access For Personal Mobile Equipments In a Wireless WAN Environment", IEEE Transactions On Consumer Electronics, vol. 43, No. 3, Jun. 1997.
Seetharaman Mani, "UPLink—Circuit Switched", Jul. 1997, Unwired Planet Specification Sheet.
S. Ramasubramani, "Airlink Architecture", Nov. 1997, Unwired Planet Specification Sheet.

* cited by examiner

Primary Examiner—Douglas Olms
Assistant Examiner—Brian Nguyen
(74) Attorney, Agent, or Firm—Beyer Weaver & Thomas, LLP

(57) ABSTRACT

The invention relates to centralized network access for wireless network carriers providing network access to wireless communication devices. The invention provides a network gateway (or proxy server) that provides access to a network of computers to various wireless network carriers having different wireless network characteristics. In one embodiment, the invention uses airlinks (or network drivers) to support the communications between the network gateway and the various wireless network carriers.

27 Claims, 15 Drawing Sheets

| Airlink ID | Carrier Name | Network Type | Carrier Transport ID | Narrowband Router Address | ENABLE |
|---|---|---|---|---|---|
| 0001 | ATT | CDPD | UDP | | Y |
| 0002 | Qualcomm | SMS-1/CDMA | SMPP | | Y |
| 0003 | Sprint | SMS-1/CDMA | EIP | | N |
| 0004 | Telia | SMS-1/GSM | CMG | | Y |
| ... | ... | ... | ... | ... | |

METHOD AND APPARATUS FOR PROVIDING NETWORK ACCESS OVER DIFFERENT WIRELESS NETWORKS

BACKGROUND OF THE INVENTION

1. Field of the Invention

The present invention relates to wireless networks, and more particularly, to providing network access over different wireless networks.

2. Description of the Related Art

The tremendous growth of the Internet in recent years has fueled the need to provide wireless devices such as mobile telephones, personal digital assistants (PDAs) and the like with access to information and services available on the Internet. However, providing wireless devices with access to the Internet is complicated by the fact that various different carrier networks with different wireless network characteristics are used domestically and world wide to communicate with the wireless devices. Examples of wireless networks include Cellular Digital Packet Data (CDPD), Global System for Mobile Communications (GSM), Code Division Multiple Access (CDMA) and Time Division Multiple Access (TDMA) to name a few, and each of these wireless networks has different data transfer characteristics such as latency, bandwidth, protocols and connection methods. As examples, protocols can be Internet Protocol (IP), Short Messaging System (SMS) and Unstructured Supplementary Service Data (USSD), and connection methods can include packet switched or circuit switched.

FIG. 1 is a block diagram of a conventional communication system 100 suitable for coupling a mobile communication device to the Internet. Specifically, the communication system 100 includes a mobile communication device 102 that couples through a carrier network 104 to a network gateway 106. The network gateway 106 facilitates the coupling of the mobile communication device 102 with the Internet 108. As is common, various computer systems including computers supporting application server A 110 and application server B 112 are coupled to or form part of the Internet 108. The primary function of the network gateway 106 is to receive data requests from the carrier network 104 and convert them into Hyper Text Transfer Protocol (HTTP) requests for use with the Internet 108. Likewise, the network gateway 106 also receives HTTP responses from the Internet 108 and converts them to data responses with a format (e.g., protocol) suitable for use with the carrier network 104.

Conventionally, the network gateway 106 is able to couple a single carrier network 104 to the Internet 108. In such cases, the network gateway 106 is specifically designed and constructed for the particular type of network and its protocols used by the carrier network 104. The network gateway 106 thus provides the various mobile communication devices utilizing the carrier network 104 with Internet access.

However, in the wireless communication world, particularly with mobile telephones, there are a wide variety of carrier networks that are used to provide telephone and data transmission services to mobile telephones. These various carrier networks often have different network types as well as different protocols for transporting data. Hence, the construction of a network gateway for use with one particular carrier network often means that the same network gateway will not support other carrier networks. Consequently, a particular carrier network will need its own network gateway to facilitate the coupling of its associated mobile communication devices with the Internet.

Such limitations are particularly problematic in the case in which a company has several carrier networks that are used to support its various subscribers having mobile communication devices. In such a case, the company will require multiple network gateways in order to couple the various carrier networks to the Internet. Each of these network gateways will be constructed somewhat differently to accommodate the wireless characteristics of the particular carrier network. Besides the general burden of providing multiple network gateways, there are other disadvantages of such an approach. One such disadvantage is that by requiring different carrier networks or information providers to provide their own gateway network is not only an inefficient use of resources but also complicates the management and servicing requirements. Another disadvantage of using multiple network gateways to support the different carrier networks is that software development costs substantially increase.

Thus, there is a need for improved ways to couple different carrier networks to the Internet in an efficient and cost effective way.

SUMMARY OF THE INVENTION

Broadly speaking, the invention relates to centralized network access for wireless network carriers providing network access to wireless communication devices. The invention provides a network gateway (or proxy server) that provides access to a network of computers to various wireless network carriers having different wireless network characteristics. In one embodiment, the invention uses airlinks (or network drivers) to support the communications between the network gateway and the various wireless network carriers.

The invention can be implemented in numerous ways, including as a method, an apparatus, and a computer system. Several embodiments of the invention are discussed below.

As a system for delivery of information from a network of computers to wireless communication devices, an embodiment of the invention includes: a plurality of wireless communication devices, the wireless communications devices including a processing unit and a display screen; a plurality of wireless network carriers, each of the wireless network carriers providing wireless communication services to the plurality of wireless communication devices, and a plurality of the wireless network carriers using a different combination of network type and transport protocol; a network of computers, one or more of the computers of the network of computers contains information; and a multi-network gateway, the multi-network gateway couples the wireless network carriers to the network of computers to facilitate data transfer therebetween, each of the plurality of the wireless network carriers using the different combination of network type and protocol are coupled to the network of computers by an airlink configured for the particular combination of network type and protocol, and each of the airlinks operate to exchange data with certain of the wireless communication devices via the wireless network carriers associated therewith.

As a gateway between a plurality of wireless network carriers and the Internet, where each of the wireless network carriers provide wireless communication services to a plurality of wireless communication devices, an embodiment of the invention includes: a HTTP interface module coupled to the Internet, a push agent, and a pull agent. The HTTP interface module interconnects the gateway with the Internet. The push agent is coupled to the HTTP interface module and includes a network driver for each of the wireless network carriers. The push agent operates to receive notification messages for particular ones of the wireless communication devices, and to forward the notification messages to the particular ones of the wireless communications devices by the network driver associated with the wireless network carrier respectively used by the particular ones of the wireless communications devices. The pull agent is coupled to the HTTP interface module and includes a network driver for each of the wireless network carriers. The pull agent operates to receive information requests for information from the Internet from particular ones of the wireless communications devices, to form HTTP requests to request the information from the Internet via the HTTP interface module, to thereafter receive HTTP responses from the Internet containing the information requested, to form information replies for the particular ones of the wireless communications devices based on the HTTP responses, and then to send the information replies to the particular ones of the wireless communications devices as per the information requests using the network driver associated with the wireless network carrier respectively used by the particular ones of the wireless communications devices.

As a method for exchanging data between the Internet and wireless communication devices, an embodiment of the invention includes the acts of: identifying an incoming request for data from the Internet from a first wireless communication device of a plurality of wireless communication devices, the incoming request being via a first carrier network of a plurality of carrier networks of different network types which use different protocols, the first carrier network having a first network type and using a first protocol; associating the incoming request for data with a first network driver configured to receive requests for data from the first carrier network in accordance with the first network type and the first protocol; receiving the incoming request for data at the first network driver; forming an HTTP request for data based on the received request for data; and forwarding the HTTP request for data to the Internet.

As a method for providing data from a wired network to wireless communication devices, an embodiment of the invention includes the acts of: receiving a notification from the wired network that is to be directed to a first wireless communication device of a plurality of wireless communication devices via a first carrier network of a plurality of carrier networks of different network types which use different protocols, the first carrier network having a first network type and using a first protocol; formulating a notification message to inform the first wireless communication device of the notification; determining a first network driver associated with the first wireless communication device from a plurality of network drivers, the first network driver being configured to send notification messages to the first wireless communication device via the first carrier network in accordance with the first network type and the first protocol; and sending the notification message to the first wireless communication device using the first network driver.

As a computer readable medium containing program code for interactive data exchange data between the a wired network and wireless communication devices, an embodiment of the invention includes: first program code for identifying an incoming request for data from the wired network from a first wireless communication device of a plurality of wireless communication devices, the incoming request being via a first carrier network of a plurality of carrier networks of different network types which use different protocols, the first carrier network having a first network type and using a first protocol; second program code for associating the incoming request for data with a first network driver configured to receive requests for data from the first carrier network in accordance with the first network type and the first protocol; third program code for receiving the incoming request for data at the first network driver; fourth program code for forming a wired network request for data based on the received request for data; and fifth program code for forwarding the wired network request for data to the wired network.

As a computer readable medium containing program code for providing data from a wired network to wireless communication devices, an embodiment of the computer readable medium includes the acts of: program code for receiving a notification from the wired network that is to be directed to a first wireless communication device of a plurality of wireless communication devices via a first carrier network of a plurality of carrier networks of different network types which use different protocols, the first carrier network having a first network type and using a first protocol; program code for formulating a notification message to inform the first wireless communication device of the notification; program code for determining a first network driver associated with the first wireless communication device from a plurality of network drivers, the first network driver being configured to send notification messages to the first wireless communication device via the first carrier network in accordance with the first network type and the first protocol; and program code for sending the notification message to the first wireless communication device using the first network driver.

The advantages of the invention are numerous. One advantage of the invention is that different carrier networks are able to interact with the Internet is an efficient and cost effective manner. Another advantage of the invention is that information providers are able to build services such that subscribers can obtain information in a relatively simple manner without having to deal with the myriad of different wireless network characteristics. Still another advantage of the invention is that application servers on the Internet are able to provide information to subscribers of wireless networks without to seriously concern themselves with having to deal with the myriad of different wireless network characteristics. Yet another advantage of the invention is that by centralizing the network access, physical resources are better utilized and software development cost are reduced.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 4 illustrates a representative airlink configuration table according to a representative embodiment of the invention;

DETAILED DESCRIPTION OF THE INVENTION

The invention relates to centralized network access for wireless network carriers providing network access to wireless communication devices. The invention provides a network gateway (or proxy server) that provides access to a network of computers to various wireless network carriers having different wireless network characteristics. In one embodiment, the invention uses airlinks (or network drivers) to support the communications between the network gateway and the various wireless network carriers.

Embodiments of the invention are discussed below with reference to FIGS. 2–12B. However, those skilled in the art will readily appreciate that the detailed description given herein with respect to these figures is for explanatory purposes as the invention extends beyond these limited embodiments.

Figure 1:
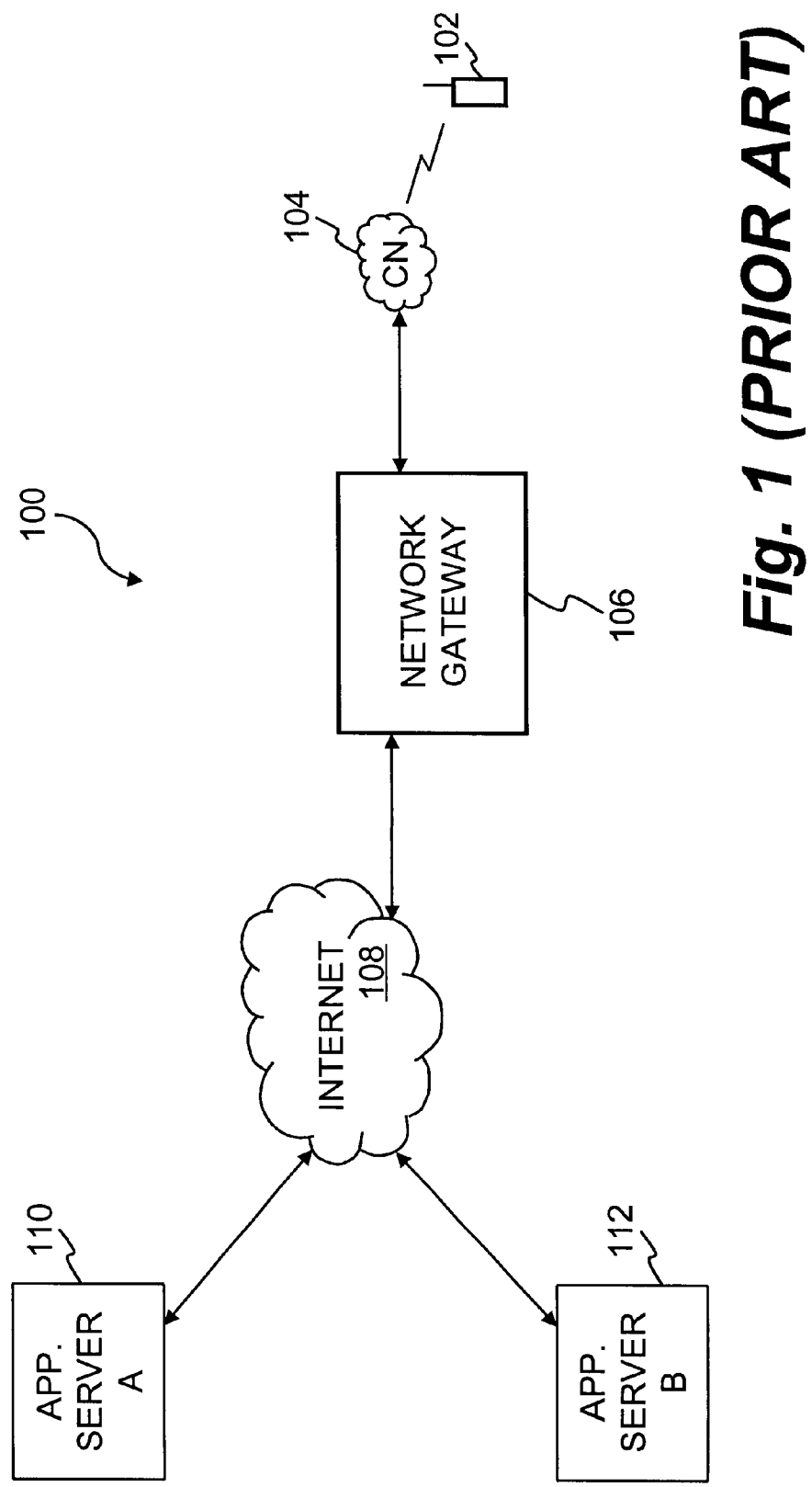
FIG. 1 is a block diagram of a conventional communication system suitable for coupling a mobile communication device to the Internet.
Figure 2:
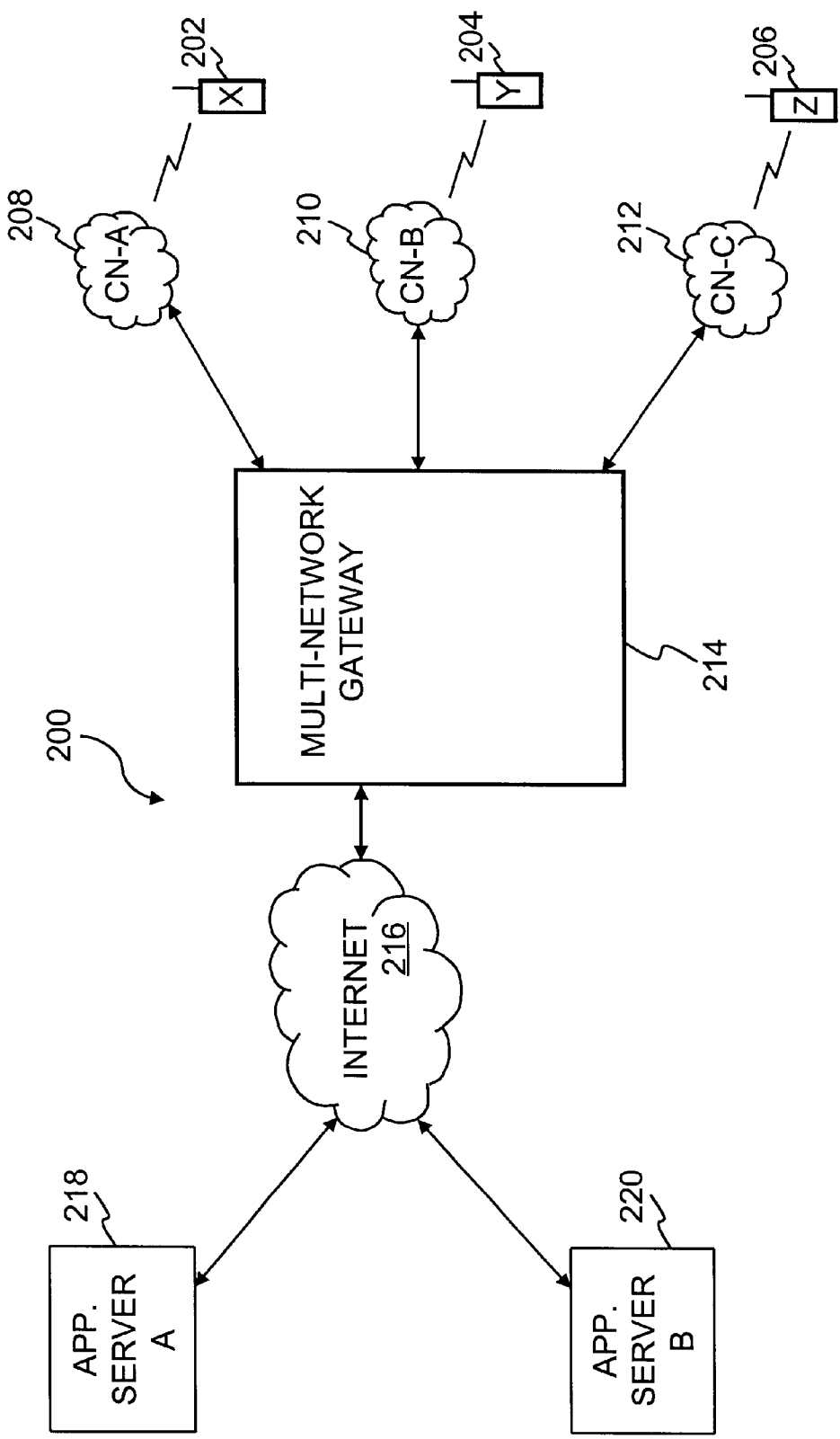
FIG. 2 is a block diagram of a communication system according to a basic embodiment of the invention.

FIG. 2 is a block diagram of a communication system 200 according to a basic embodiment of the invention. The communication system 200 is a wireless communication system that provides Internet access to wireless communication devices 202, 204 and 206. Each of the wireless communication devices 202, 204 and 206 are illustrated as coupling to the communication system 200 through a different carrier network. Specifically, the wireless communication device 202 couples to the Internet via a carrier network A (CN-A) 208, the wireless communication device 204 couples to the Internet via a carrier network B (CN-B) 210, and the wireless communication device 206 couples to the Internet through a carrier network C (CN-C) 212. Each of the carrier networks 208, 210 and 212 can have a different network type as well as use a different protocol. Hence, the communication system 200 is able to support many different wireless carrier networks with a single, or central, multi-network gateway. Given the large number of different wireless carrier networks, the ability to support different carrier networks is an advantage.

The communication system 200 also includes a multi-network gateway 214. The multi-network gateway 214 is able to couple various wireless carrier networks with different network characteristics to the Internet 216. In other words, the communication system 200 enables the wireless communication devices 202, 204 and 206 to access and retrieve information from the Internet via the multi-network gateway 214 regardless of differences in the wireless carrier networks 208, 210 and 212. Hence, even though different wireless carrier networks are coupled to the Internet 216 by the multi-network gateway 214, the ability to access and retrieve information from the Internet 216 is available to each of the wireless communication devices 202, 204 and 206 regardless of the particular wireless carrier network 208, 210 and 212 being utilized.

The wireless communication devices 202, 204 and 206 will often seek to obtain information from application servers located on the Internet 216. FIG. 2 illustrates a representative application server A 218 and a representative application server B 220 of or on the Internet 216. For example, the wireless communication devices 202, 204 and 206 may seek to obtain information from the application server A 218 or the application server B 220 located on the Internet 216. As an example, the application server A 218 can be associated with an e-mail application program that provides e-mail services for wireless communication devices. On the other hand, the application server B 220 can be associated with a stock information service that provides stock update notifications and other stock information to registered subscribers with wireless communication devices.

Although the embodiment of the invention described with reference to FIG. 2 provides access to the Internet, the invention more generally provides access to a network of computers which would include, for example, the Internet and intranets. Moreover, in FIG. 2, the carrier networks A, B and C 208, 210 and 212 are illustrated and it is assumed that each of these carrier networks are different. The carrier networks are different in the type of network they implement and/or in the particular protocols they use. However, it should be understood that nothing prevents the communication system 200 from including certain carrier networks that implement the same network type with the same protocols as other carrier networks within the communication system 200. Still further, although the carrier networks 208, 210 and 212 are illustrated as supporting the wireless communication devices 202, 204 and 206, respectively, it should be understood that normally each of the carrier networks 208, 210 and 212 will support many wireless communication devices.

Figure 3:
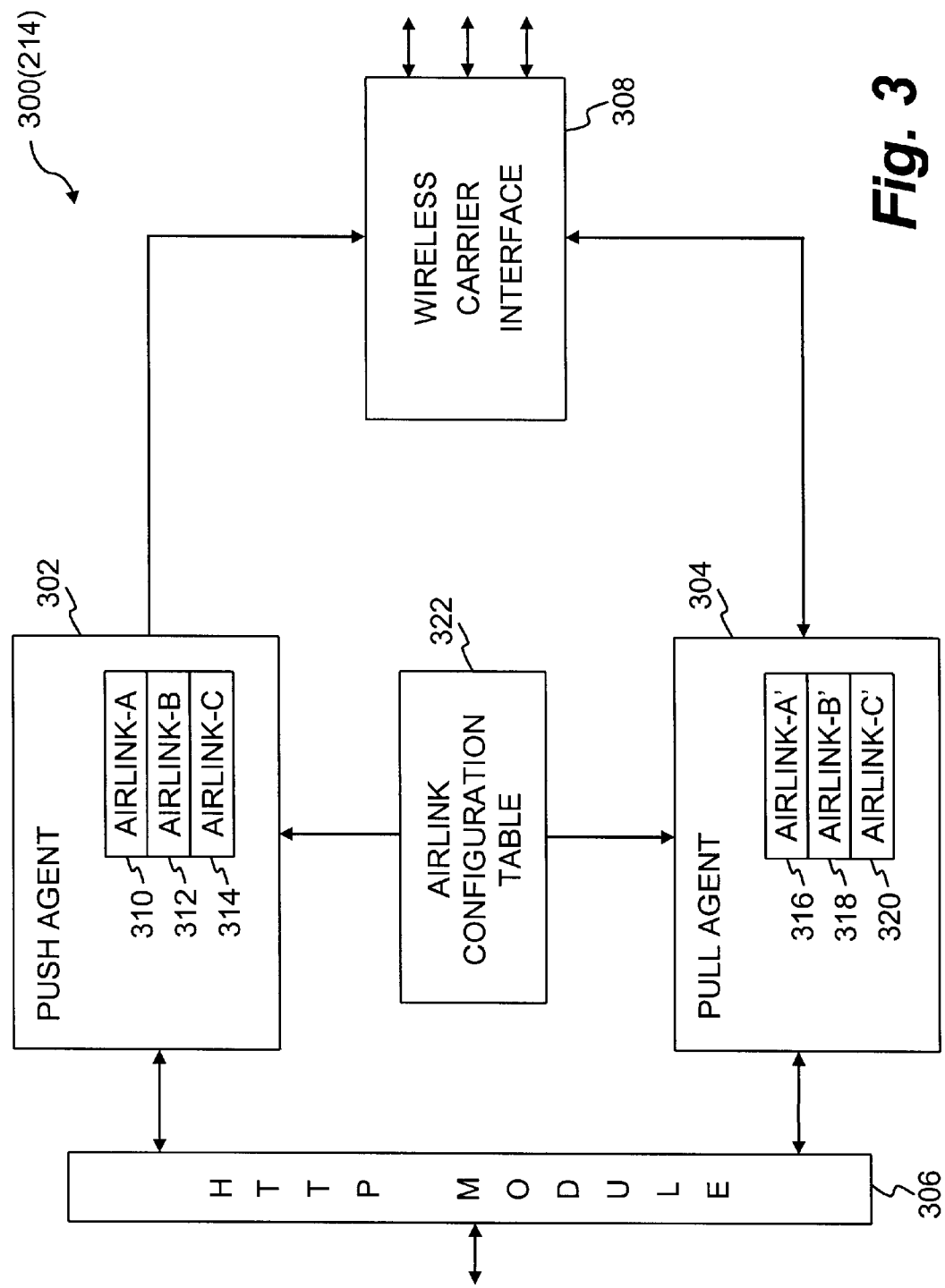
FIG. 3 is a block diagram of a multi-network gateway according to one embodiment of the invention.

FIG. 3 is a block diagram of a multi-network gateway 300 according to one embodiment of the invention. The multi-network gateway 300 is, for example, suitable for use as the multi-network gateway 214 illustrated in FIG. 2. Specifically, the multi-network gateway 300 assumes that the multi-network gateway is facilitating the coupling of three different carrier networks to the Internet. As illustrated in FIG. 2, the three carrier networks are referred to as carrier network A, carrier network B, and carrier network C.

The multi-network gateway 300 includes a push agent 302 and a pull agent 304. The push agent 302 and the pull agent 304 are in general agents or processing modules within the multi-network gateway 300 that serve to provide wireless communication devices with access to information from the Internet 216. The push agent 302 operates to "push" information content from the Internet to the wireless communication devices. The pull agent 304 operates to "pull" information content from the Internet 216 when requested by the wireless communication devices. The push agent 302 and pull agent 304 are coupled to the Internet 216 by an HTTP module 306. Also, the push agent 302 and the pull agent 304 are coupled to the carrier networks A, B and C by a wireless carrier interface 308.

In order for the multi-network gateway 300 to support the various carrier networks, the push agent 302 and the pull agent 304 include airlinks for each of the carrier networks. These airlinks are specialized programming resources that are designed to correspond and interact with the particular wireless network characteristics associated with the corresponding carrier network. The airlinks can also be referred to as network drivers because they are used to communicate with the carrier networks. In any case, the push agent 302 includes an airlink-A 310 for use with the carrier network A, an airlink-B 312 for use with the carrier network B, and an airlink-C 314 for use with the carrier network C. Similarly, the pull agent 304 includes an airlink-A' 316 for use with the carrier network A, an airlink-B' 318 for use with the carrier network B, and an airlink-C' 320 for use with the carrier network C. The corresponding airlinks (e.g., A and A') in the push agent 302 and the pull agent 304 are similar but can differ in certain aspects such as, for example, retry mechanisms or delivery acknowledgments.

The multi-network gateway 300 also includes an airlink configuration table 322. The airlink configuration table 322 contains information regarding the network types and protocols used by the various carrier networks. In this described embodiment, the airlink configuration table 322 contains network types and protocols for the carrier network A, the carrier network B and the carrier network C. The airlink configuration table 332 also includes information identifying the particular airlink to be used in the multi-network gateway 300 for each of the respective carrier networks coupling to the multi-network gateway 300.

FIG. 4 illustrates a representative airlink configuration table 400 according to a representative embodiment of the invention. The airlink configuration table 400 is, for example, suitable for use as the airlink configuration table 332 illustrated in FIG. 3. As illustrated in FIG. 4, the airlink configuration table 400 includes a row entry for each carrier network. For each carrier network, the column entries describe the following characteristics of the carrier network: airlink identifier (ID), carrier name, network type, carrier transport identifier (ID), narrowband router address, and airlink enable. The airlink ID is the unique identifier for a particular airlink used in the multi-network gateway 300. The carrier name is the particular name associated with the carrier network, such as AT&T or Sprint. The network types include, for example, Cellular Digital Packet Data (CDPD) and various types of Short Messaging System (SMS) networks (e.g., SMS-1/CDMA and SMS-1/GSM) or narrowband networks (e.g., Unstructured Supplementary Service Data (USSD)). The carrier transport ID indicates the protocol used by the network, such as User Datagram Protocol (UDP), Short Message Peer-to-peer Protocol (SMPP), EIP or CMG. The narrowband router address provides an address to a suitable narrowband router used in certain embodiments of the multi-network gateway when providing information over a narrowband channel. The airlink enable is used to indicate whether or not a particular airlink should be activated during initialization of the multi-network gateway. As noted in the representative airlink configuration table 400, the airlinks for the AT&T, Qualcomm and Telia networks are enabled and therefore operational, and the airlink for the Sprint network is disabled and therefore not operational. Hence, as an example, the airlinks for the carrier networks A, B and C are denoted in the airlink configuration table 400 by the airlink identifiers 0001, 0002 and 0004, respectively.

Figure 5A:
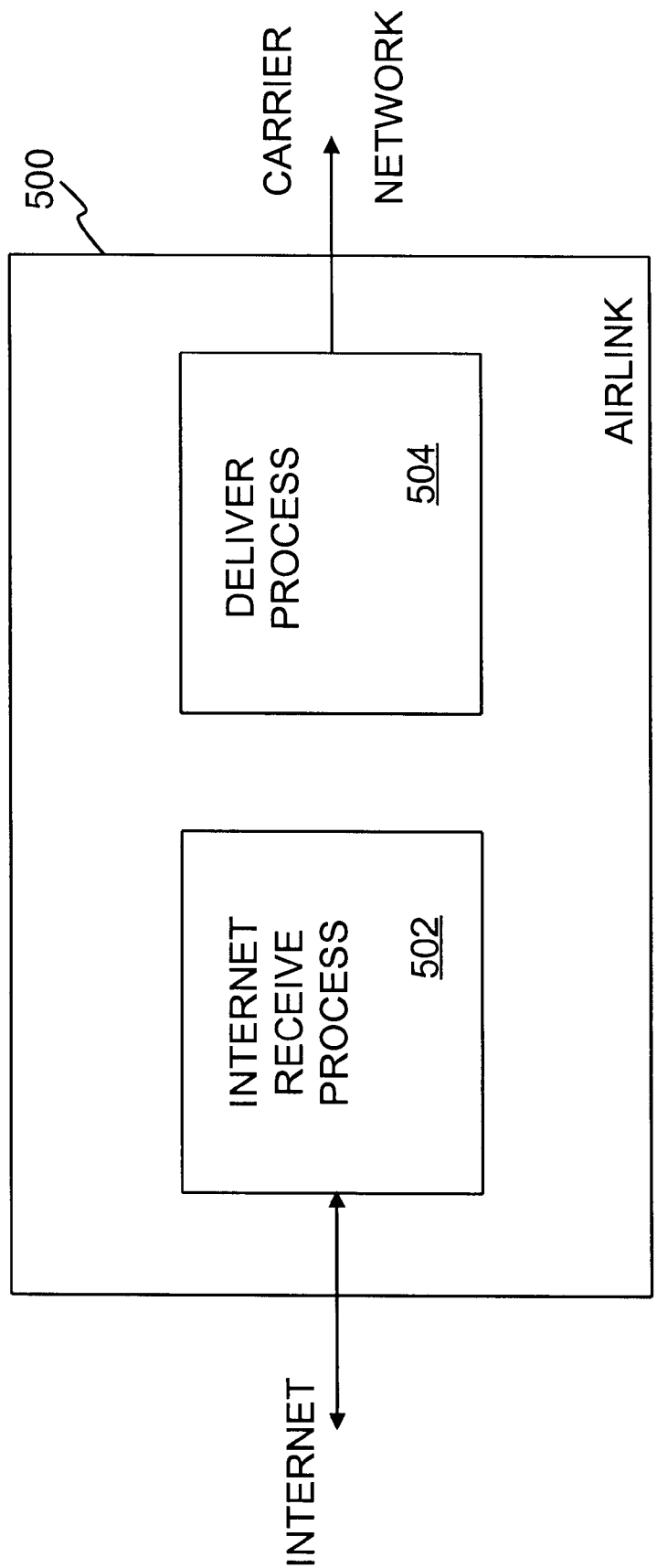
FIGS. 5A and 5B are schematic diagrams of airlinks according to an embodiment of the invention.
Figure 5B:
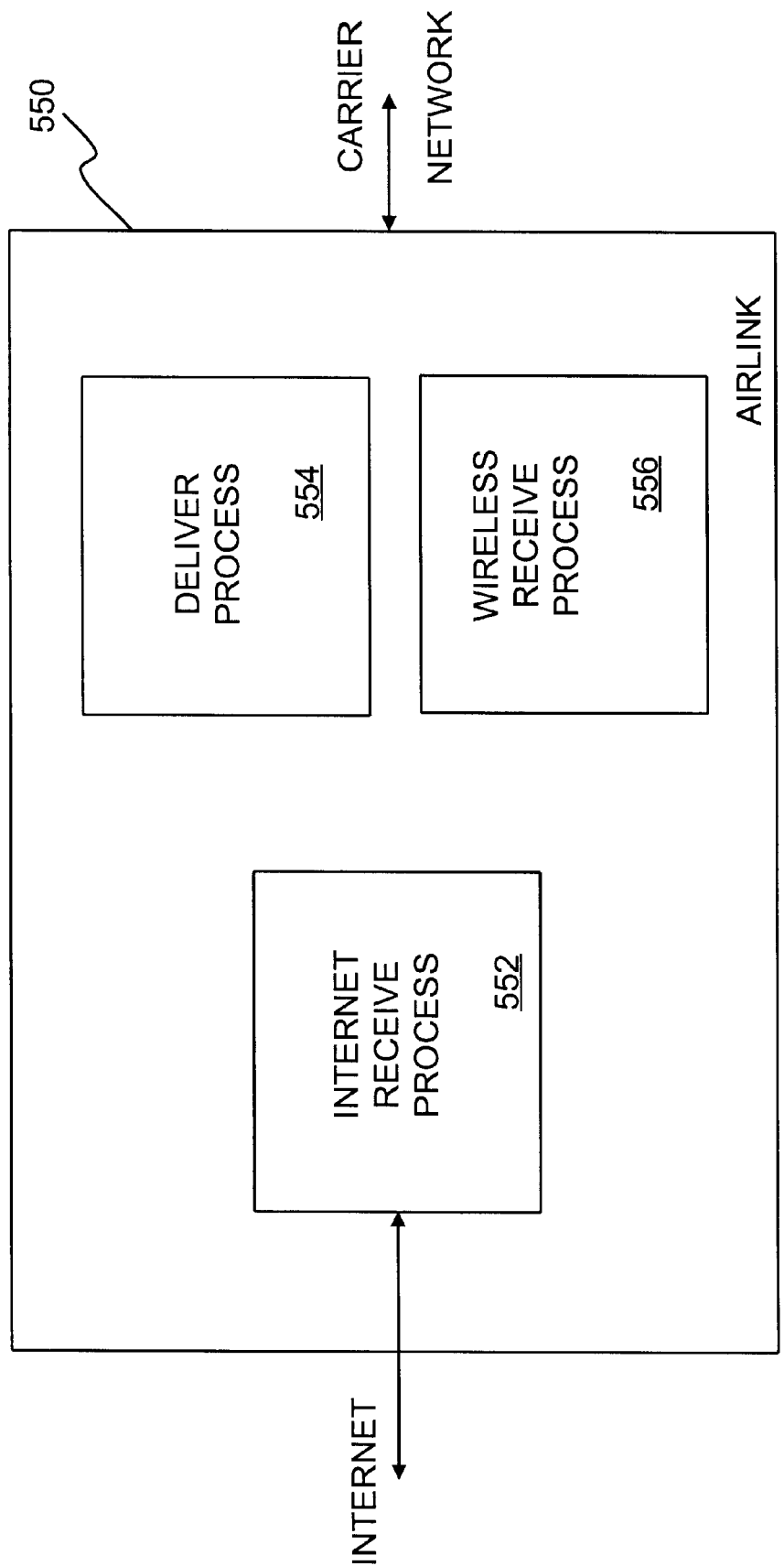

FIGS. 5A and 5B are schematic diagrams of airlinks according to an embodiment of the invention. The airlinks as noted above are network device drivers that facilitate communications with the carrier networks by performing conversions between protocols or other network characteristics. The airlinks are responsible for sending data to or receiving data from the carrier networks.

FIG. 5A illustrates an airlink design 500 suitable for use in a push agent (e.g., the push agent 302). The airlink design 500 includes two specific processes or functions, namely, an Internet receive process 502 and a deliver process 504. The Internet receive process 502 operates to receive a notification from the Internet. After receiving the notification via the Internet receive process 502, the push agent processes the notification to form a Protocol Data Unit (PDU). The push agent also identifies the appropriate deliver process 504 to send the PDU to the target or destination address via the carrier network. In other words, the push agent determines the airlink to be utilized to send the PDU. The PDU can also be referred to as a notification message. Optionally, the deliver process 504 can also operate wait for an acknowledgment that the notification was received and may also retry the sending as needed.

FIG. 5B illustrates an airlink design 550 suitable for use in a pull agent (e.g., the pull agent 304). The airlink design 550 includes three specific processes or functions, namely, an Internet receive process 552, a deliver process 554, and a wireless receive process 556. The Internet receive process 552 operates to receive a reply from the Internet. The reply from the Internet is in response to a prior request by the pull agent to the Internet. After receiving the reply via the Internet receive process 502, the pull agent processes the reply to form a Protocol Data Unit (PDU). The pull agent also identifies the appropriate deliver process 554 to send the PDU to the target or destination address via the carrier network. In other words, the pull agent will determine the airlink to be utilized to send the PDU. The PDU can also be referred to as a data response. Optionally, the deliver process 554 can also operate wait for an acknowledgment that the PDU was received and may also retry the sending as needed.

The airlink 500 can either be for unidirectional use or bi-directional use. For example, the push agent 302 illustrated in FIG. 3 provides only uni-directional transmission from the Internet 216 to the wireless communication devices. Typically, the push agent 302 forwards notifications to certain of the wireless communication devices. Hence, the airlinks 310, 312 and 314 of the push agent 302 would only need to forward notifications from the Internet 216 to the wireless communication devices 202, 204 and 206, and thus would have the airlink design 500 illustrated in FIG. 5A. Hence, within the push agent 302, the Internet receive process 502 would be receiving information from the Internet 216, and the deliver processe 504 would send information to the carrier network. On the other hand, the pull agent 304 of the multi-network gateway 300 operates in a bi-directional manner. Therefore, the airlinks 316, 318 and 320 within the pull agent 304 will include deliver and receive processes with respect to the carrier network. The airlinks 316, 318 and 300 would thus have the airlink design 550 illustrated in FIG. 5B. The deliver process supports the transport of information from the pull agent to the wireless communication devices. The wireless receive process 556 supports the reception of information from the wireless communication devices.

Carrier networks are commonly classified into packet-switched networks and circuit-switched networks. In packet-switched networks, communications between the carrier network and the wireless communication device can use Internet Protocol (IP) addressing because the wireless communication device has its own individual IP address. Circuit-switched networks, on the other hand, require the establishment of a circuit with the carrier network before the wireless communication device can communicate with the carrier network. In such networks, the wireless communication devices do not have a static IP address but instead have a dynamically assigned IP address or unique phone numbers. One example of a packet-switched carrier network is CDPD. One example of a circuit-switched network is Code Division Multiple Access (CDMA) and Global System for Mobile communications (GSM).

Figure 6:
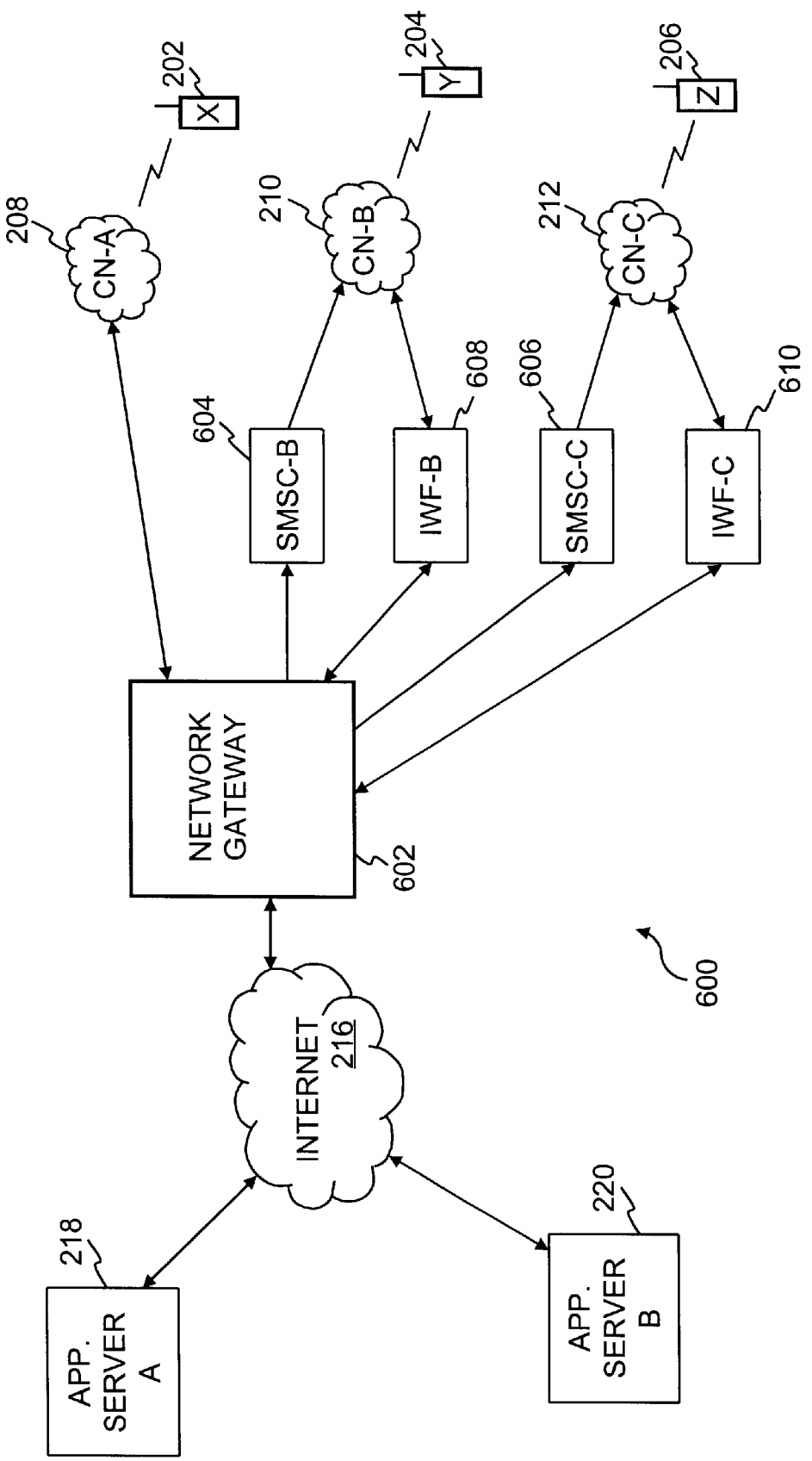
FIG. 6 is a block diagram of a communication system according to an embodiment of the invention.

FIG. 6 is a block diagram of a communication system 600 according to an embodiment of the invention. The communication system 600 includes a network gateway 602 that facilitates access and retrieval of information from the Internet 216 to the wireless communication devices 202, 204 and 206 as did the multi-network gateway 214 illustrated in FIG. 2. The communication system 600, however, specifically pertains to the situation where the carrier network A 208 is a packet-switched network such as CDPD, the carrier network B 210 is a SMS-type network using CDMA with an interface protocol of SMPP, and the carrier network C 212 is another SMS-type network that uses GSM with an interface protocol of UCP.

Since the carrier network B 210 and the carrier network C 212 are circuit-switched networks using SMS, they use Small Message Server Centers (SMSCs) and Inter-Working Functions (IWF) to provide communication with the carrier networks. The use of the SMSCs and the IWFs are conventional and typically provided by the carrier networks so that messaging and interaction can be achieved with the carrier networks. Hence, the communication system 600 includes SMSC-B 604 and SMSC-C 606 which respectively provide message services to wireless communication devices coupled to the carrier network B 210 and the carrier network C 212, respectively. The SMSCs 604 and 606 provide one-way notifications from the multi-network gateway 602 to the wireless communication devices on the carrier network B 210 and the carrier network C 212, respectively. The IWF-B 608 and the IWF-C 610 are respectively used to provide two-way interaction between the network gateway 602 and the carrier network-B 210 and the carrier network-C 212, respectively. The SMSC connections to the carrier networks are typically referred to as narrowband channels, whereas the IWF connections to the carrier networks are wideband channels.

Figure 7:
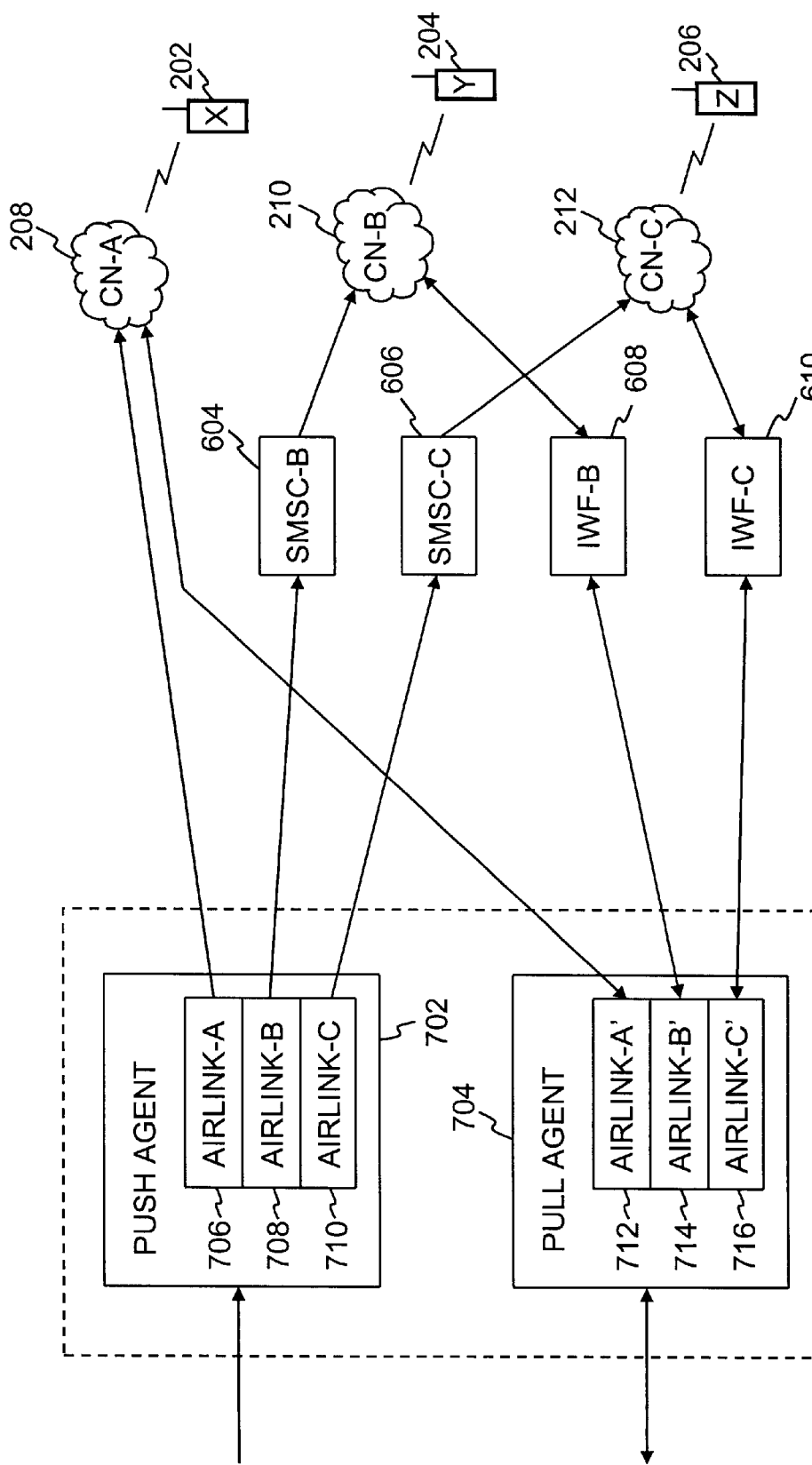
FIG. 7 is a detailed diagram of the network gateway illustrated in FIG. 6.

FIG. 7 is a detailed diagram of the network gateway 602 illustrated in FIG. 6. In particular, the network gateway 602 includes a push agent 702 and a pull agent 704. The push agent 702 is associated with a narrowband channel between the network gateway 602 and the carrier networks B and C 210 and 212. More particularly, the push agent 702 includes a plurality of airlinks that are associated with the carrier networks of the communication system 600. Specifically, the push agent 702 includes an airlink-A 706 for use with the carrier network A 208, an airlink-B 708 for use with the carrier network B 210, and an airlink-C 710 for use with the carrier network C 212. Each of the airlinks 706, 708 and 710 are designed to properly interact with the characteristics with the associated wireless carrier network. The airlink-A 706 is coupled to the carrier network A 208 which is, for example, a CDPD network. The airlink-B 708 is coupled to the carrier network B 210 through the SMSC-B 604 because the carrier network B 210 is a circuit-switched type of network that requires use of an SMSC. Likewise, the airlink-C 710 couples to the carrier network C 212 through the SMSC-C 606 because the carrier network C 212 is also a circuit-switched type of network that requires use of a SMSC. Hence, the push agent 702 is able to "push" a notification triggered by an application server on the Internet 216 to an appropriate one or more of the wireless communication devices 202, 204 and 206.

The push agent 702 is generally used to "push" information from the Internet 216 to the wireless communication devices. The information being pushed is normally a notification. For example, an e-mail application on the Internet might push a subscriber a notification that they have new e-mail waiting. Another example is a stock application on the Internet that might push a subscriber a notification that they have updated stock information available. If a notification from an application on the Internet 216 is destined for the wireless communication device 202, the notification would be provided to the push agent 702. The push agent 702 then determines that the airlink-A 706 should be used for communicating with the wireless communication device 202. The push agent 702 then directs the notification to the airlink-A 706 which in turn forwards the notification in the suitable format to the carrier network-208. The carrier network A 208 then forwards the notification in a wireless manner to the wireless communication device 202. If a notification from an application on the Internet 216 is destined for the wireless communication device 204, the notification is provided to the push agent 702. The push agent 702 then determines that the airlink-B 708 should be used for communicating with the wireless communication device 204. The push agent 702 then directs the notification to the airlink-B 708 which in turn forwards the notification in the suitable format to the SMSC-B 604. The SMSC-B 604 then forwards the notification to the carrier network B 210 which in turn forwards the notification in a wireless manner to the wireless communication device 204. Similarly, if the notification is destined for the wireless communication device 206, the notification is provided to the push agent 702. The push agent 702 then determines that the airlink-C 710 should be used for communicating with the wireless communication device 206. The push agent 702 then directs the notification to the airlink-C 710 which in turn forwards the notification in the suitable format to the SMSC-C 606. The SMSC-C 606 then forwards the notification on to the carrier network C 212 which then in turn forwards the notification in a wireless manner to the wireless communication device 206.

The pull agent 704 is generally used to "pull" information from the Internet 216 and provide it to the wireless communication devices. The "pulling" of information from the Internet 216 is usually a bi-directional communication using the HTTP protocol at the Internet side and different wireless network characteristics on the carrier network side. Hence, the pull agent 704 performs conversion processing between the HTTP protocol and the various protocols used by the associated wireless carrier networks coupled to the pull agent 704. In this regard, the pull agent 704 includes an airlink for each of the associated carrier networks. The airlink for a particular carrier network performs the conversion between protocols and network types so that information can be properly sent and received over the carrier networks. The airlinks also manage the sending information from and receiving information to the multi-network gateway 602. In particular, the pull agent 704 includes an airlink-A' 712 that is used to send and receive data to and from the carrier network A 208. The pull agent 704 also includes airlink-B' 714 that sends and receives data to and from the carrier network B 210. The pull agent 704 still further includes an airlink-C' 716 that sends and receives information to and from the carrier network C 212. In a described embodiment, the carrier network A 208 is a CDPD type of network, and the carrier network B 210 and the carrier network C 212 are SMS type networks. Hence, the airlink-B' 714 couples to the carrier network B 210 through the IWF-B 608, and the airlink-C' 716 couples to the carrier network C 212 through the IWF-C 610.

Figure 8A:
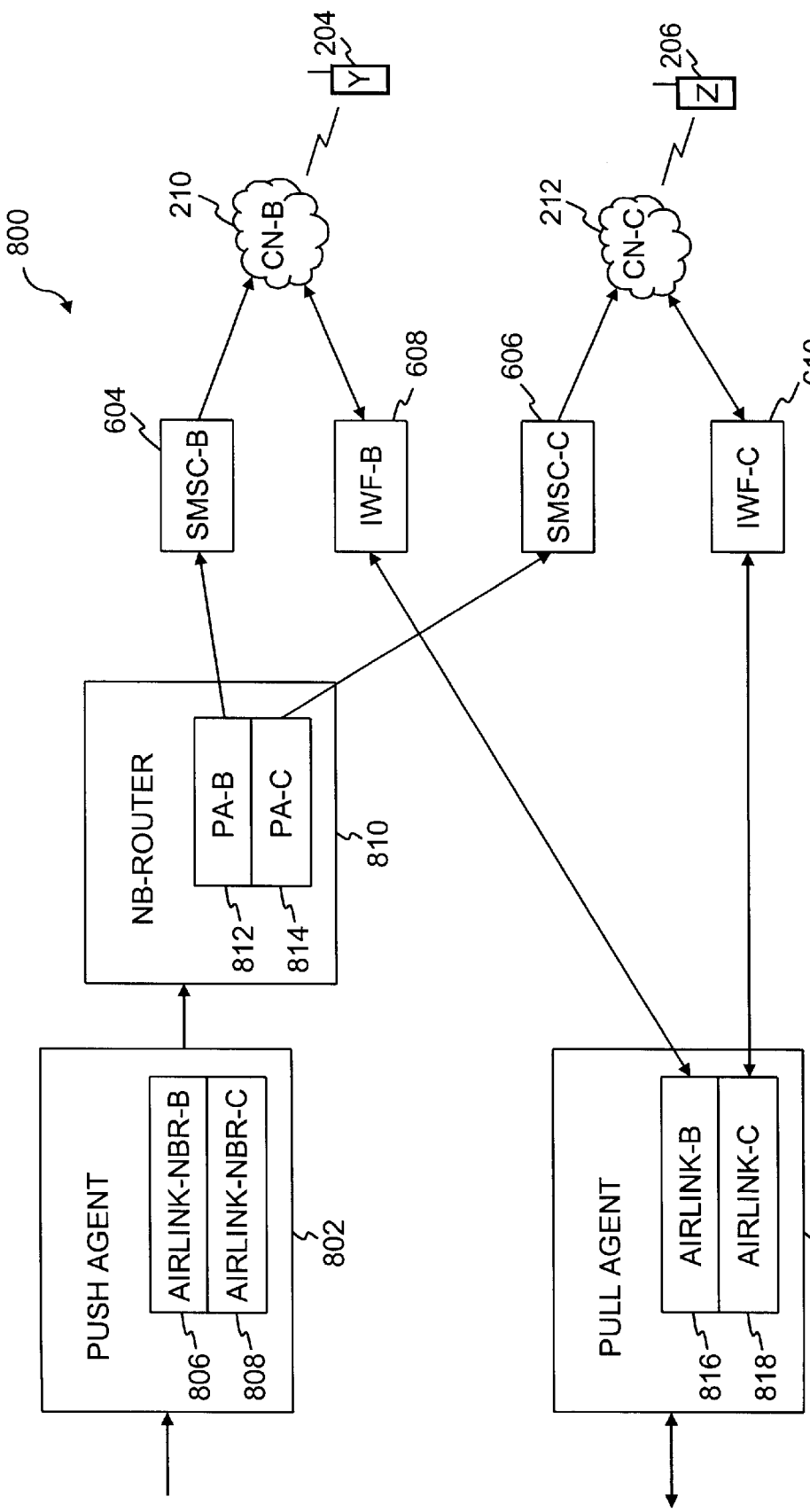
FIG. 8A is a block diagram of a communication system according to another embodiment of the invention.

FIG. 8A is a block diagram of a communication system 800 according to another embodiment of the invention. The communication system 800 illustrates a communication system for use between the Internet 216 and the carrier network B 210 and the carrier network C 212 to provide wireless communication services for wireless communication devices such as the wireless communication device 204 and the wireless communication device 206. Similar to the communication system 600 illustrated in the FIGS. 6 and 7, the communication system 800 includes a push agent 802 and a pull agent 804. The push agent 802 includes airlinks as do previously described embodiments of the invention. However, in this embodiment, the airlinks included in the push agent 802 include an airlink-NBR-B 806 and an airlink-NBR-C 808. These airlinks 806 and 808 send and receive information to and from a narrowband router (NB-router) 810. The NB-router 810 acts as an intermediary between the airlinks 806 and 808 and the SMSC units 604 and 606. The NB-router 810 performs some routing to the appropriate SMSC units 604 and 606 which are associated with the narrowband channel as well as provides protocol adapters for the SMSC units 604 and 606. The NB-router 810 includes protocol adapters that are associated with each SMSC units 604 and 606. For example, the NB-router 810 includes a protocol adapter (PA-B) 812 that provides protocol adaptation to the protocol of the SMSC-B 604 and the protocol adapter PA-C 814 provides protocol adaptation for the protocol used by the SMSC-C 606. The routing performed by the NB-router 810 operates to route messages (information) destined for a particular wireless device on a particular carrier network to the appropriate protocol adapter associated with the appropriate SMSC unit for the particular carrier network. Additionally, the routing performed by the NB-router 810 also operates to route acknowledgments or original requests from a particular wireless device to the appropriate airlink in the pull agent 804. Hence the NB-router 810 off loads the interaction with the SMSC units from the push agent 802. One advantage of this design is that the processing load on the push agent 802 is reduced. Another advantage of this design is that scalability of the multi-network gateway improves with the one or more push agents able to share the capabilities provided by the NB-router 810.

If the agent or agents of the communication system were required to communicate directly with the SMSC (i.e., without the benefit of a NB-router), then as the multi-network gateway would need various additional agents to handle increased processing loads. The SMSC units would have to allocate additional endpoint addresses for the additional agents so that mobile originated messages could be properly delivered. Such design would increase the configuration and management complexity both in the multi-network gateway and the SMSC units. Further, the complexity would be increased because the multi-network gateway is capable of supporting multiple SMS interface protocols. Also, with various agents, there would be increased complexity when new SMS interface protocols were to be supported. Hence, by providing the NB-router, the protocols for use with the SMSC units is confined to a single location so that they may be better managed. In other words, the protocol adapters for the SMSC units are centralized in the NB-router.

The communication system 800 illustrated in FIG. 8A is referred to as one-way SMS for the narrow band channel together with a separate wide band channel. Two-way SMS may now or in the future become available from some network carriers. Two-way SMS allows bi-directional communications over SMS using a channel with a relatively low bandwidth though likely greater capacity than that provided by one-way SMS.

Figure 8B:
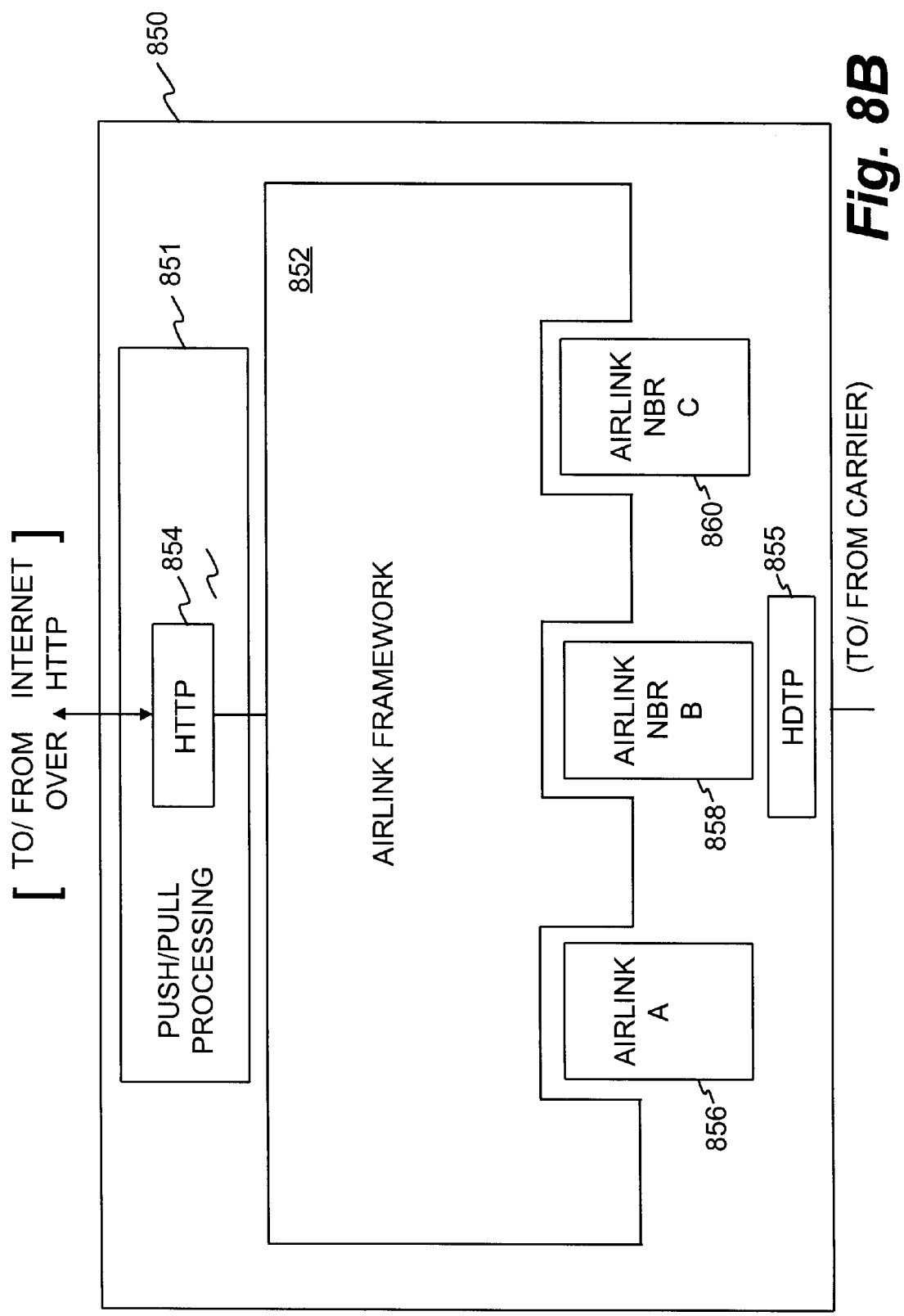
FIG. 8B is a diagram illustrating an airlink framework within a push agent or a pull agent according to an embodiment of the invention.

FIG. 8B is a diagram illustrating an airlink framework within a push agent or a pull agent according to an embodiment of the invention. More specifically, a push or pull agent 850 includes push/pull processing 851 and an airlink framework 852. The airlink framework 852 is, for example, a framework for the airlinks within the push agent 802 or the pull agent 804 of the communication system 800. The airlink framework 852 represents a processing model for the airlinks within the push agent or the pull agent and their interface to the carrier networks. As illustrated, the airlink framework 852 can communicate with an application server on the Internet 216 using an HTTP interface 854. The push/pull processing 851 is also able to communicate with carrier networks via a Handheld Device Transport Protocol (HDTP) interface 855 which can operate with User Datagram Protocol (UDP) and interact with a Handheld Device Markup Language (HDML) browser in the wireless communication device. The airlink framework 852 includes airlinks for the various carrier networks having different network types and/or protocols. Namely, with respect to FIGS. 7 and 8A, the airlinks plugged-into the airlink framework 852 include airlink A 856, airlink-NBR-B 858, and airlink-NBR-C 860. The airlink A 856, airlink-NBR-B 858 and airlink-NBR-C 860 can respectively correspond to the airlinks A, B and C 706, 708 and 710 or the airlinks 712, 714 and 716 in FIG. 7. More particularly, since the airlinks 858 and 860 are for a NB-router, the airlink-NBR-B 858 and the airlink-NBR-C 860 can respectively correspond to the airlink-NBR-B 806 and the airlink NBR-C 808 in FIG. 8A.

Figure 9:
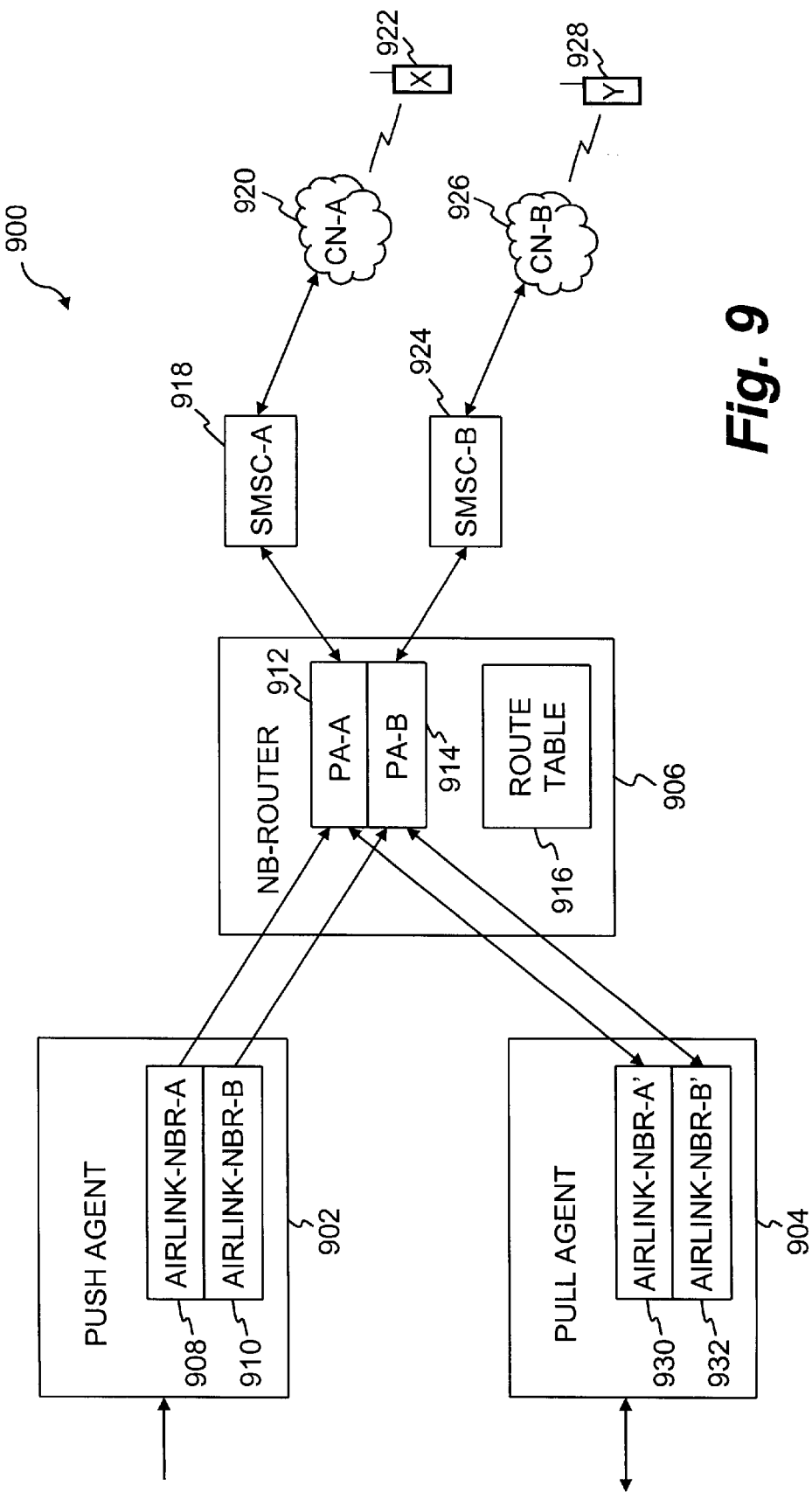
FIG. 9 illustrates a communication system that provides two-way communications over a narrowband channel according to another embodiment of the invention.

FIG. 9 illustrates a communication system 900 that provides two-way communications over a narrowband channel according to another embodiment of the invention. More particularly, the communication system 900 provides two-way SMS as a narrowband channel without additionally having a separate wideband channel. However, the communication system 900 could also include a wideband channel if desired.

The communication system 900 includes a push agent 902, a pull agent 904 and a NB-router 906. The pull agent 902 includes an airlink-NBR-A 908 and an airlink-NBR-B 910. The airlink-NBR-A 908 directs notification messages to a protocol adapter (PA-A) 912 in the NB-router 906 and the airlink-NBR-B 910 directs notification messages to a protocol adapter (PA-B) 914 in the NB-router 906. The NB-router 906 also includes a route table 916 that associates a port number to each of the airlinks in the push agent 902 and the pull agent 904. The route table 916 can also associate each connection with the same port. Using the route table 916, the NB-router 906 can route information between the appropriate airlinks and the SMSC units. Table 1 below illustrates a representative route table for use with the embodiment of the invention illustrated in FIG. 9, where a connection handle (for a connection) is a programming construct that allows messages to be sent or received.

TABLE 1

| Port Number | Connection Handle | Client (Agent-Airlink) |
|---|---|---|
| 1 | H1 | Push Agent-A |
| 1 | H2 | Push Agent-A |
| 2 | H3 | Push Agent-B |
| 2 | H4 | Push Agent-B |
| 2 | H5 | Push Agent-B |
| 2 | H6 | Push Agent-B |
| 3 | H7 | Pull Agent-A |
| 3 | H8 | Pull Agent-A |
| 4 | H9 | Pull Agent-B |

The NB-router 906 (or the protocol adapter (PA-A) 912 itself is able to forward notification messages from the protocol adapter (PA-A) 912 to a SMSC-A 918 which in turn forwards the messages to a carrier network A 920. The carrier network-A 920 then forwards the notification messages in a wireless manner to wireless communication devices including the wireless communication device 922. The NB-router 906 (or the protocol adapter (PA-B) 914 itself is likewise able to forward notification messages from the protocol adapter (PA-B) 914 to a SMSC-A 924 which in turn forwards the messages to a carrier network B 926. The carrier network B 926 then forwards the notification messages in a wireless manner to wireless communication devices including a wireless communication device 928.

To provide two-way SMS, the NB-router 906 needs to provide for receiving requests from the wireless communication devices 922 and 928 back to the multi-network gateway or, more specifically, the pull agent 904. With two-way SMS, requests from the wireless communication device 922 can be forwarded in a wireless manner to the carrier network A 920. The carrier network A 920 then forwards the request to the SMSC-A 918. The request is then forwarded by the SMSC-A 918 to the protocol adapter (PA-A) 912. Then, using the port table 916, the appropriate port associated with an airlink-NBR-A' 930 within the pull agent 904 is identified. The protocol adapter (PA-A) 912 then forwards the request from the wireless communication device 922 to the port of the pull agent 904 where the airlink-NBR-A' 930 is waiting to receive such request. In a similar manner, when the wireless communication device 928 sends a request for information from the Internet 216, the request is sent in a wireless manner to the carrier network B 926. The carrier network B 926 then forwards the request onto the SMSC-B 924. The SMSC-B 924 then forwards the request to the protocol adapter (PA-B) 914 within the NB-router 906. Then, using the port table 916, the NB-router 906 determines the port of the pull agent 904 where an airlink-NBR-B' 932 resides so that the message can be forwarded to that airlink which is waiting to receive such request.

Figure 10:
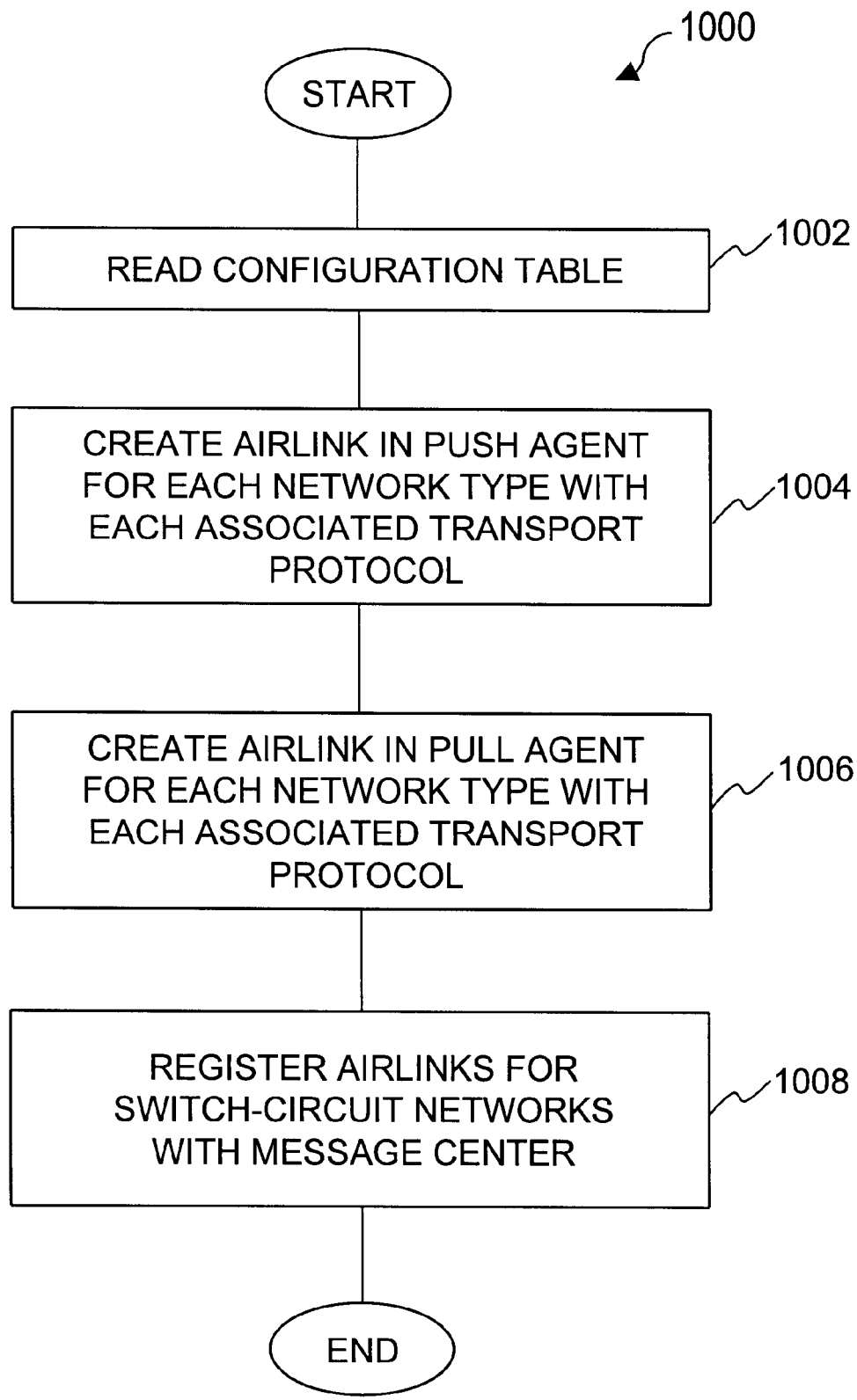
FIG. 10 is a flow diagram of airlink formation processing according to an embodiment of the invention.

FIG. 10 is a flow diagram of airlink formation processing 1000 according to an embodiment of the invention. The airlink formation processing 1000 initially reads 1002 configuration information from a configuration table. For example, the configuration table is the airlink configuration table 322 illustrated in FIG. 3 and has contents such as represented by the airlink configuration table 400 illustrated in FIG. 4. After the configuration information is read, an airlink is created 1004 in the push agent for each network type with each associated transport protocol. For example, with respect to the airlink configuration table 400 illustrated in FIG. 4, at least three (3) airlinks would be created in the push agent. The airlinks are identified that are created have airlink IDs 0001, 0002 and 0004. As an example, these airlinks could be respectively used with the carrier networks A, B and C which were discussed above. The airlink reference by airlink ID 0003 is not created because the airlink enable field disables the airlink from the airlink formation processing 1000. Next, airlinks are created 1006 in the pull agent for each network type with each associated transport protocol. Hence, in a similar fashion, airlinks are created for the pull agent. With respect to the airlink configuration table 400 illustrated in FIG. 4, the pull agent would likewise form three (3) airlinks, identified by the airlink IDs 0001, 0002 and 0004. Although the airlinks in the push agent and the pull agent generally have the same format and construction, it should be noted that the airlinks established in the push agent may differ slightly from those established in the pull agent. One reason for the difference in the construction of the airlinks is that a retry mechanism for retrying the sending of information that has not been acknowledged as having been received could differ. Also, in certain cases, same or similar carrier networks are able to use a common airlink. In any case, after having created all the necessary airlinks, those of the airlinks that are associated with switch-circuit networks are registered 1008 with the corresponding message centers (e.g., SMSC units). By registering the airlinks, the switch-circuit networks are able to understand that messages or requests from the wireless communication devices being sent out should be directed to the appropriate multi-network gateway. Following block 1008, the airlink formation processing 1000 is complete and ends.

Figure 11:
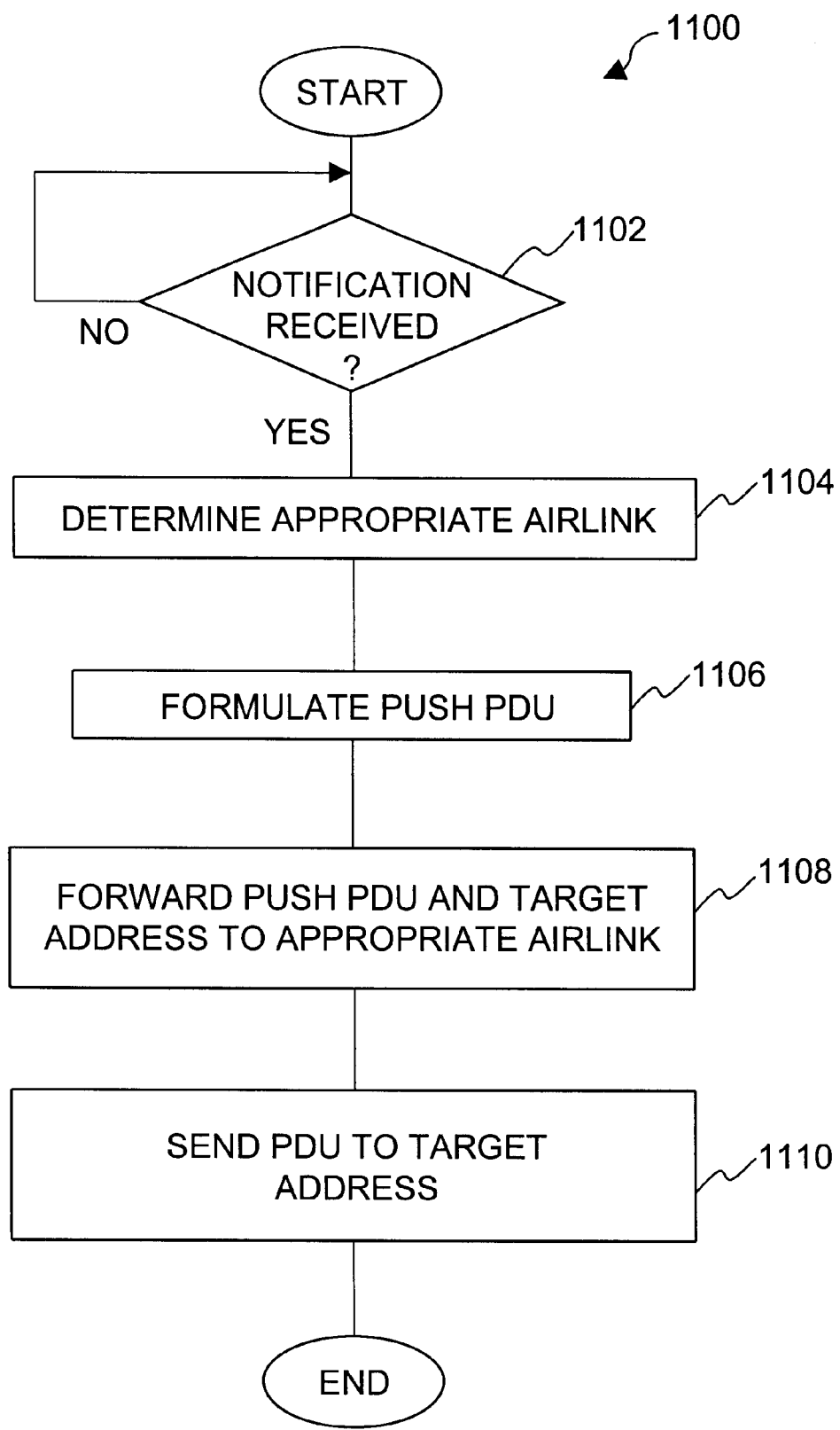
FIG. 11 is a flow diagram of push agent processing according to an embodiment of the invention.

FIG. 11 is a flow diagram of push agent processing 1100 according to an embodiment of the invention. The push agent processing 1100 is processing performed by the push agent of the multi-network gateway.

The push agent processing 1100 initially begins with a decision block 1102. The decision block 1102 determines whether a notification has been received from an application on the Internet. As long as no notification has been received, the push agent processing 1100 simply waits for the receipt of such a notification. Once the decision block 1102 determines that a notification has been received, then the push agent processing 1100 continues. When the push agent processing 1100 continues, for a given notification that has been received, an appropriate airlink is determined 1104. Since the notification that has been received is to be directed to a particular wireless communication device associated with a particular carrier network, the push agent processing 1100 needs to determine 1104 which of the plurality of airlinks associated with the push agent is responsible for communicating with the particular carrier network. For example, the notification will include a target address (e.g., subscriber identifier) that identifies the subscriber of the wireless communication device, knowing the subscriber, the multi-network gateway can determine the device identifier for the wireless communication device and the airlink identifier.

After determining the appropriate airlink for the notification being processed, a push protocol data unit (push PDU) is formulated 1106. The push agent is responsible for forming a push PDU that is to be sent by the multi-network gateway to the wireless communication device. As noted above, a PDU is a common term associated with sending a block of data to a communication device. Next, the push PDU and the target address are forwarded 1108 to the appropriate airlink. Upon receiving the push PDU and the target address, the airlink sends 1110 the push PDU to the target address via the particular carrier network. Following block 1110 the push agent processing 1100 is complete and ends.

Figure 12A:
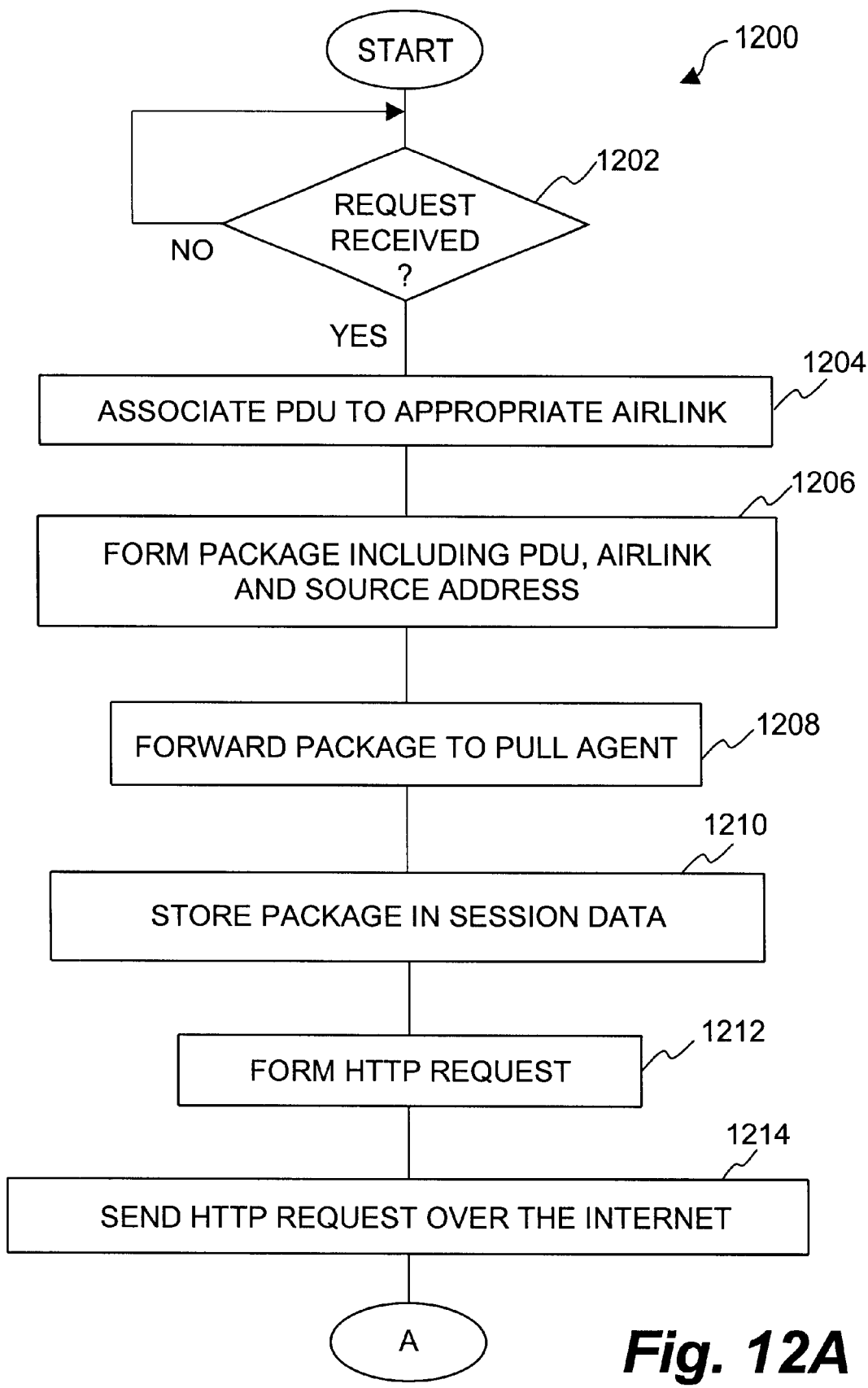
FIGS. 12A and 12B are flow diagrams of pull agent processing according to an embodiment of the invention.
Figure 12B:
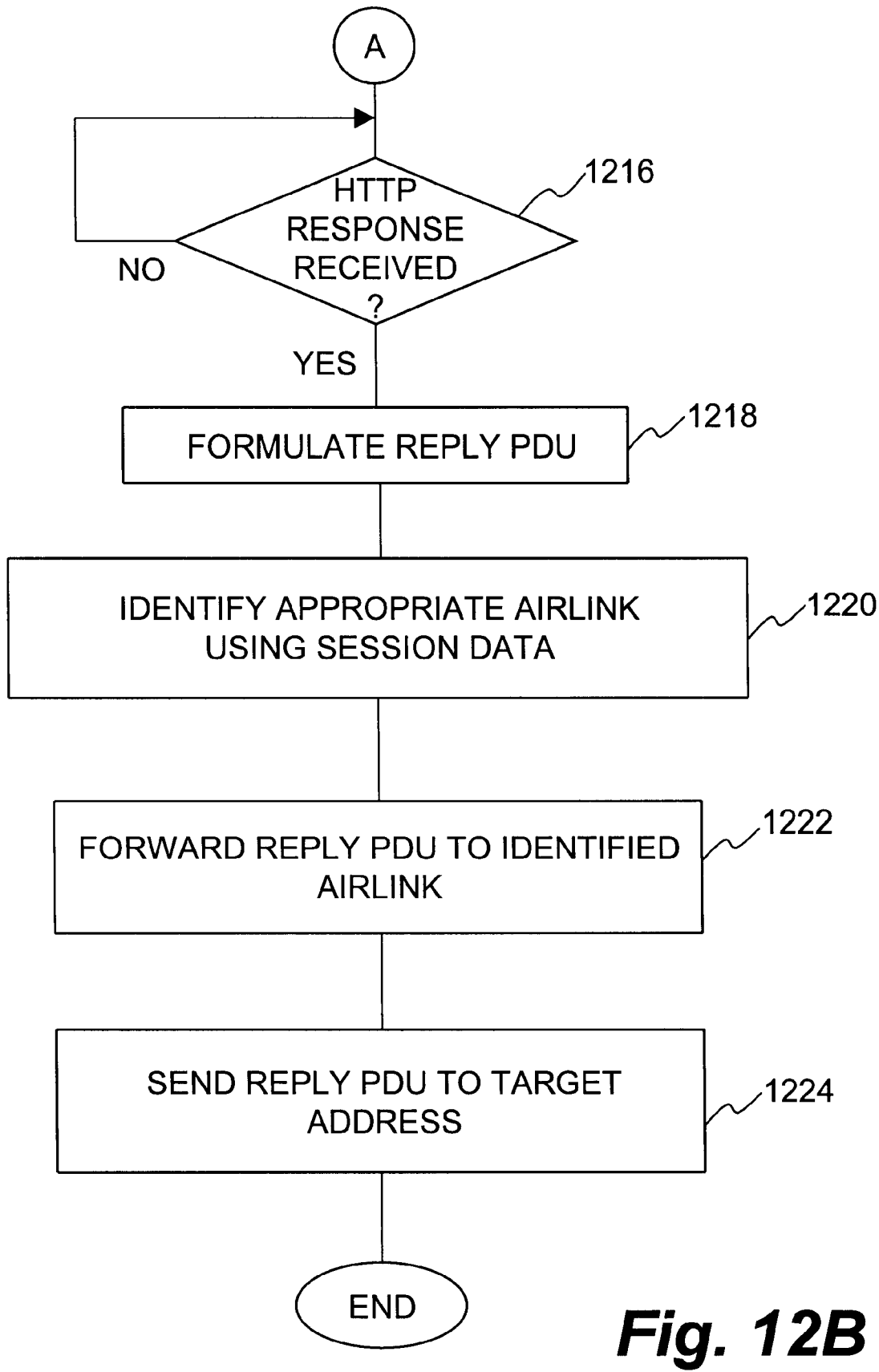

FIGS. 12A and 12B are flow diagrams of pull agent processing 1200 according to an embodiment of the invention. The pull agent processing 1200 is performed by the pull agent within the multi-network gateway.

The pull agent processing 1200 initially begins with a decision block 1202 that determines whether a request has been received. If a request has not yet been received, the pull agent processing 1200 waits for the receipt of such request. Once a request has been received, the pull agent processing 1200 continues. The request that is received is normally a PDU from a wireless communication device.

Once the pull agent processing 1200 continues, the received PDU is associated 1204 with an appropriate airlink within the pull agent. The appropriate airlink is the airlink within the pull agent that is to receive the request (i.e., PDU) that has been received from the wireless carrier network associated with the wireless communication device. Next, the appropriate airlink will operate to form 1206 a package that includes the PDU, the appropriate airlink, and the source address. Then, the package is forwarded 1208 to the pull agent.

After receiving the package, the pull agent then stores 1210 the package in its session data. The session data is maintained by the pull agent to record state information associated with requests being processed by the pull agent. Next, the pull agent forms 1212 a HTTP request. The HTTP request is formed such that the information being requested by the wireless communication device is in fact requested from an application server on the Internet. The pull agent then sends 1214 the HTTP request over the Internet.

After sending the HTTP request, the pull agent waits for a HTTP response from the Internet. Here, a decision block 1216 implements the waiting by determining whether a HTTP response has been received. As long as no HTTP response to the HTTP request has been received, the decision block 1216 causes the pull agent processing 1200 to await such a response. Once the HTTP response has been received, the pull agent processing 1200 operates to formulate 1218 a reply PDU. Here, the pull agent forms the reply PDU from the HTTP response. Then, the appropriate airlink is identified 1220 using the session data. The appropriate airlink for the reply PDU is obtained from the session data which associates the airlink with the original source address which now corresponds to the target address for the reply PDU. After the appropriate airlink is identified, the reply PDU is forwarded 1222 to the identified airlink within the pull agent. The identified airlink within the pull agent then sends 1224 the reply PDU to the target address. Here, by the airlink sending the reply PDU to the target address, the reply PDU is forwarded to the appropriate carrier network then on to the wireless communication device that originally requested the information it now receives in the reply PDU. Following block 1224 the pull agent processing 1200 is complete and ends.

It should be noted that the push agent processing 1100 and the pull agent processing 1200 are preferably implemented in an multi-threaded manner. As such, multiple operations can be performed concurrently for improved efficiency. Also, those skilled in the art should recognize that the decision blocks 1102, 1202 and 1216 would be implemented by separate threads that wait to receive the associated items such that the processing resources of the multi-network gateway are not inefficiently used in constantly polling for the items.

Additional details on the design, construction and operation of network gateways and mobile devices are contain in (1) U.S. application Ser. No. 08/570,210, now U.S. Pat. No. 5,809,415 entitled "METHOD AND ARCHITECTURE FOR AN INTERACTIVE TWO-WAY DATA COMMUNICATION NETWORK"; (2) U.S. application Ser. No. 09/071,379 now U.S. Pat. No. 6,138,158, entitled "METHOD AND SYSTEM FOR INTEGRATING NARROWBAND AND WIDEBAND DATA TRANSPORTS", by Stephen S. Boyle et al., filed concurrently herewith; and (3) U.S. application Ser. No. 09/071,216 now U.S. Pat. No. 6,247,048 entitled "METHOD AND APPARATUS FOR TRANSCODING CHARACTER SETS BETWEEN INTERNET HOSTS AND THIN CLIENT DEVICES OVER DATA NETWORKS", by Russell S. Greer et al.; each of these applications are hereby incorporated by reference in their entireties. Additional details concerning Internet protocols, namely, Hypertext Transfer Protocol (HTTP), can be found in Fielding et al., HTTP 1.1, Aug. 12, 1996, which is hereby incorporated by reference.

The advantages of the invention are numerous. One advantage of the invention is that different carrier networks are able to interact with the Internet is an efficient and cost effective manner. Another advantage of the invention is that information providers are able to build services such that subscribers can obtain information in a relatively simple manner without having to deal with the myriad of different wireless network characteristics. Still another advantage of the invention is that application servers on the Internet are able to provide information to subscribers of wireless networks without to seriously concern themselves with having to deal with the myriad of different wireless network characteristics. Yet another advantage of the invention is that by centralizing the network access, physical resources are better utilized and software development cost are reduced.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A system for delivery of information from a network of computers to wireless communication devices, said system comprising:

a plurality of wireless communication devices, said wireless communication devices including a processing unit and a display screen;

a plurality of wireless network carriers, each of said wireless network carriers providing wireless communication services to said plurality of wireless communication devices, and said plurality of said wireless network carriers using a different combination of network type and transport protocol;

a network of computers, one or more of the computers of said network of computers contains information; and a multi-network gateway having at least a plurality of airlinks, said multi-network gateway couples said wireless network carriers to said network of computers to facilitate data transfer therebetween, each of the plurality of said wireless network carriers using a particular combination of network type and protocol are coupled to said network of computers by at least one of the airlinks configured for the particular combination of network type and protocol, and each of the airlinks operate to exchange data with certain of said wireless communication devices via said wireless network carriers associated therewith, wherein said multi-network gateway comprises a pull agent, said pull agent operates to receive a request from a particular one of said wireless communication devices via a particular one of said plurality of wireless network carriers for information residing on said network of computers, then operates to formulate a network request for the information using a protocol associated with said network of computers and then sends the network request to said network of computers and awaits a network reply, and once the network reply is received, the network reply is converted to a device reply and then sends the device reply to the particular one of said wireless communication devices via the particular one of said plurality of wireless network carriers in accordance with a protocol associated with the particular one of said plurality of wireless network carriers.

2. A system as recited in claim 1, wherein said network of computers is the Internet.

3. A system as recited in claim 1, wherein said network of computers is an intranet.

4. A system as recited in claim 1, wherein said wireless communication devices include one or more mobile phones.

5. A system as recited in claim 1, wherein said pull agent comprises at least one of the airlinks for receiving the request from the particular one of said wireless communication devices and for sending the device reply to the particular one of said wireless communication devices via the particular one of said plurality of wireless network carriers in accordance with the protocol associated with the particular one of said plurality of wireless network carriers.

6. A system as recited in claim 1, wherein said pull agent comprises a plurality of the airlinks, each of the airlinks being used for one of said plurality of wireless network carriers using the different combination of network type and protocol, and each of said airlinks operate to receive the request from the particular one of said wireless communication devices associated therewith and to send the device reply to the particular one of said wireless communication devices via the particular one of said plurality of wireless network carriers associated therewith in accordance with the protocol associated with the particular one of said plurality of wireless network carriers.

7. A system as recited in claim 6, wherein said multi-network gateway further comprises:

a configuration table that stores information associating each of the plurality of said wireless network carriers with one of said airlinks.

8. A system as recited in claim 6, wherein said multi-network gateway further comprises:

a push agent, said push agent operates to receive a notification request from said network of computers to be forwarded to a particular one of said plurality of wireless communication devices via a particular one of said wireless network carriers, then operates to formulate a device notification message, and then sends the device notification message to the particular one of said wireless communication devices via the particular one of said plurality of wireless network carriers in accordance with a protocol associated with the particular one of said plurality of wireless network carriers.

9. A system as recited in claim 8, wherein said push agent comprises a plurality of airlinks, each of the airlinks being used for one of said plurality of wireless network carriers using the different combination of network type and protocol, and each of said airlinks operate to send the device notification message to the particular one of said wireless communication devices via the particular one of said plurality of wireless network carriers associated therewith in accordance with the protocol associated with the particular one of said plurality of wireless network carriers.

10. A system as recited in claim 9, wherein said multi-network gateway further comprises:

a configuration table that stores information associating each of the plurality of said wireless network carriers with one of said airlinks.

11. A system as recited in claim 9, wherein said push agent provides at least one narrowband communication channel between said network of computers and said wireless network carriers, and wherein said pull agent provides at least one wideband communication channel between said network of computers and said wireless network carriers.

12. A system as recited in claim 1, wherein one of said wireless network carriers is a CDPD type network, and another one of said wireless network carriers is a SMS type network.

13. A gateway between a plurality of wireless network carriers and the Internet, each of the wireless network carriers providing wireless communication services to a plurality of wireless communication devices, said gateway comprising:

a HTTP interface module coupled to the Internet, said HTTP interface module interconnects said gateway with the Internet;

a push agent coupled to said HTTP interface module and including a network driver for each of the wireless network carriers, said push agent operates to receive notification messages for particular ones of the wireless communication devices, and to forward the notification messages to the particular ones of the wireless communication devices by the network driver associated with the wireless network carrier respectively used by the particular ones of the wireless communication devices; and a pull agent coupled to said HTTP interface module and including a network driver for each of the wireless network carriers, said pull agent operates to receive information requests for information from the Internet from particular ones of the wireless communication devices, to form HTTP requests to request the information from the Internet via said HTTP interface module, to thereafter receive HTTP responses from the Internet containing the information requested, to form information replies for the particular ones of the wireless communication devices based on the HTTP responses, and then to send the information replies to the particular ones of the wireless communication devices th at sent the information requests using the network driver associated with the wireless network carrier respectively used by the particular ones of the wireless communication devices.

14. A gateway as recited in claim 13, wherein said gateway further comprises:

a configuration table, said configuration table containing information associating the wireless communication devices to the network drivers in said push agent and said pull agent.

15. A method for exchanging data between the Internet and wireless communication devices through a network gateway having a plurality of network drivers for use with different carrier networks that use different network types and protocols, said method comprising:

(a) identifying an incoming request for data from the Internet from a first wireless communication device of a plurality of wireless communication devices, the incoming request being via a first carrier network of a plurality of carrier networks of different network types which use different protocols, the first carrier network having a first network type and using a first protocol;

(b) associating the incoming request for data with a first network driver within the network gateway that is configured to receive requests for data from the first carrier network in accordance with the first network type and the first protocol, the first network driver being one of the plurality of network drivers;

(c) receiving the incoming request for data at the first network driver;

(d) forming an HTTP request for data based on the received request for data; and (e) forwarding the HTTP request for data to the Internet, wherein said associating (b) comprises:

(b1) receiving a source identifier from the incoming request for data, the source identifier uniquely identifies the first wireless communication device; and (b2) determining the first network driver from a plurality of network drivers based on the source identifier.

16. A method as recited in claim 15, wherein said determining (b2) operates to retrieve the identity of the first network driver from an account information table based on the source identifier.

17. A method as recited in claim 16, wherein the source identifier is a source address.

18. A method as recited in claim 15, wherein said method comprises:

(f) receiving a HTTP response from the Internet, the HTTP response containing the data requested by the HTTP request;

(g) formulating a reply to the first wireless communication device based on the HTTP response;

(h) forwarding the reply to the first network driver; and (i) sending the reply to the first wireless communication device using the first network driver, the first network driver being configured to send data to the first wireless communication device from the first network driver via the first carrier network in accordance with the first network type and the first protocol.

19. A method for providing data from a wired network to wireless communication devices through a network gateway, said method comprising:

(a) receiving a notification from the wired network that is to be directed to a first wireless communication device of a plurality of wireless communication devices via a first carrier network of a plurality of carrier networks of different network types which use different protocols, the first carrier network having a first network type and using a first protocol;

(b) formulating a notification message to inform the first wireless communication device of the notification;

(c) determining a first network driver within the network gateway that is associated with the first wireless communication device from a plurality of network drivers within the network gateway, the first network driver being configured to send notification messages to the first wireless communication device via the first carrier network in accordance with the first network type and the first protocol; and (d) sending the notification message to the first wireless communication device using the first network driver.

20. A method as recited in claim 19, wherein the wired network is the Internet, and the notification is created by an application coupled to the Internet.

21. A method as recited in claim 19, wherein the notification message includes a target address, and wherein the notification message is directed to the target address by the first network driver via the first carrier network, thereby directing the notification message to the first wireless communication device.

22. A computer readable medium containing program code for interactive data exchange between a wired network and wireless communication devices, said computer readable medium comprising:

first program code for identifying an incoming request for data from the wired network from a first wireless communication device of a plurality of wireless communication devices, the incoming request being via a first carrier network of a plurality of carrier networks of different network types which use different protocols, the first carrier network having a first network type and using a first protocol;

second program code for associating the incoming request for data with a first network driver configured to receive requests for data from the first carrier network in accordance with the first network type and the first protocol;

third program code for receiving the incoming request for data at the first network driver;

fourth program code for forming a wired network request for data based on the received request for data; and fifth program code for forwarding the wired network request for data to the wired network.

23. A computer readable medium as recited in claim 22, wherein said second program code comprises:

program code for receiving a source identifier from the incoming request for data, the source identifier uniquely identifies the first wireless communication device; and program code for determining the first network driver from a plurality of network drivers based on the source identifier.

24. A computer readable medium as recited in claim 22, wherein said computer readable medium comprises:

sixth program code for receiving a wired network response from the wired network, the wired network response containing the data requested by the wired network request;

seventh program code for formulating a reply to the first wireless communication device based on the wired network response;

eighth program code for forwarding the reply to the first network driver; and ninth program code for sending the reply to the first wireless communication device using the first network driver, the first network driver being configured to send data to the first wireless communication device from the first network driver via the first carrier network in accordance with the first network type and the first protocol.

25. A computer readable medium containing program code for providing data from a wired network to wireless communication devices, said computer readable medium comprising:

program code for receiving a notification from the wired network that is to be directed to a first wireless communication device of a plurality of wireless communication devices via a first carrier network of a plurality of carrier networks of different network types which use different protocols, the first carrier network having a first network type and using a first protocol;

program code for formulating a notification message to inform the first wireless communication device of the notification;

program code for determining a first network driver associated with the first wireless communication device from a plurality of network drivers, the first network driver being configured to send notification messages to the first wireless communication device via the first carrier network in accordance with the first network type and the first protocol; and program code for sending the notification message to the first wireless communication device using the first network driver.

26. A computer readable medium as recited in claim 25, wherein the wired network is the Internet, and the notification is created by an application coupled to the Internet.

27. A computer readable medium as recited in claim 25, wherein the notification message includes a target address, and wherein the notification message is directed to the target address by the first network driver via the first carrier network, thereby directing the notification message to the first wireless communication device.

\* \* \* \* \*